US012607800B2

(12) United States Patent
Dainese, Jr. et al.

(10) Patent No.: US 12,607,800 B2
(45) Date of Patent: Apr. 21, 2026

(54) HOLLOW-CORE OPTICAL FIBERS AND METHODS FOR PRODUCING THE SAME

(71) Applicant: CORNING INCORPORATED, Corning, NY (US)

(72) Inventors: Paulo Clovis Dainese, Jr., Painted Post, NY (US); Wei Jiang, Vestal, NY (US); Ming-Jun Li, Horseheads, NY (US); Xiaojun Liang, Chino Hills, CA (US); Dan Trung Nguyen, Painted Post, NY (US); Ilia Andreyevich Nikulin, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 285 days.

(21) Appl. No.: 18/226,331

(22) Filed: Jul. 26, 2023

(65) Prior Publication Data

US 2024/0034664 A1 Feb. 1, 2024

Related U.S. Application Data

(60) Provisional application No. 63/467,064, filed on May 17, 2023, provisional application No. 63/467,087,
(Continued)

(51) Int. Cl.
*G02B 6/032* (2006.01)
*C03B 37/012* (2006.01)
(Continued)

(52) U.S. Cl.
CPC ............ *G02B 6/032* (2013.01); *C03B 37/012* (2013.01); *C03B 37/0256* (2013.01);
(Continued)

(58) Field of Classification Search
CPC ................ G02B 6/02328; G02B 6/032; C03B 37/0256; C03B 37/012; C03B 37/02328;
(Continued)

(56) References Cited

U.S. PATENT DOCUMENTS 7,272,285 B2 * 9/2007 Benoit .................. C03C 25/106
385/124
7,310,466 B2 * 12/2007 Fink ................... G02B 6/02361
385/100
(Continued)

FOREIGN PATENT DOCUMENTS

CN 111257992 A 6/2020
CN 114721084 A 7/2022
(Continued)

OTHER PUBLICATIONS

A. D. Pryamikov et al., "Demonstration of a waveguide regime for a silica hollow-core microstructured optical fiber with a negative curvature of the core boundary in the spectral region > 3.5 μm", Optics Express, vol. 19, 2011, pp. 1441-1448.
(Continued)

*Primary Examiner* — Rhonda S Peace
(74) *Attorney, Agent, or Firm* — Kevin L. Bray

(57) ABSTRACT

A method for producing a hollow-core preform may include rolling a glass sheet to form a rolled-glass structure; and attaching one or more of the rolled-glass structures to an inner surface of an annular support structure to form a hollow-core preform, wherein the inner surface of the annular support structure defines an interior cavity and the one or more of the rolled-glass structures are positioned within the interior cavity. The hollow-core preform may be drawn into a hollow-core optical fiber.

19 Claims, 12 Drawing Sheets

Related U.S. Application Data filed on May 17, 2023, provisional application No. 63/394,126, filed on Aug. 1, 2022.

(51) Int. Cl.
  *C03B 37/025* (2006.01)
  *G02B 6/02* (2006.01)
  *G02B 6/036* (2006.01)

(52) U.S. Cl.
  CPC ..... *G02B 6/02328* (2013.01); *G02B 6/02361* (2013.01); *G02B 6/02376* (2013.01); *G02B 6/03622* (2013.01); *C03B 2203/16* (2013.01)

(58) Field of Classification Search
  CPC ........ C03B 37/02361; C03B 37/02376; C03B 37/03622
  See application file for complete search history.

(56) References Cited

U.S. PATENT DOCUMENTS

| | | |
|---|---|---|
| 8,181,485 B2 | 5/2012 | Coffey et al. |
| 8,359,884 B2 | 1/2013 | Hawtof |
| 8,438,876 B2 | 5/2013 | Noni, Jr. |
| 10,185,084 B2 | 1/2019 | Butler et al. |
| 10,393,956 B2 | 8/2019 | Russell et al. |
| 10,816,721 B1 | 10/2020 | Chenard et al. |
| 10,859,763 B2 | 12/2020 | Xu et al. |
| 12,298,554 B2* | 5/2025 | Fiacco .................. C03B 23/207 |
| 2004/0223715 A1 | 11/2004 | Benoit et al. |
| 2005/0226579 A1 | 10/2005 | Fink et al. |
| 2005/0232560 A1 | 10/2005 | Knight et al. |
| 2006/0193583 A1 | 8/2006 | Dong et al. |
| 2017/0160467 A1 | 6/2017 | Poletti et al. |
| 2020/0024178 A1 | 1/2020 | Corrado et al. |
| 2020/0278491 A1 | 9/2020 | Poletti et al. |
| 2024/0034664 A1* | 2/2024 | Dainese, Jr. ....... G02B 6/02376 |
| 2024/0036249 A1* | 2/2024 | Drake ................ G02B 6/02328 |
| 2024/0036252 A1* | 2/2024 | Dainese, Jr. ........... G02B 6/032 |
| 2024/0036253 A1* | 2/2024 | Dainese, Jr. ........ C03B 37/0256 |
| 2024/0150218 A1* | 5/2024 | Dainese, Jr. ...... C03B 37/02718 |
| 2024/0150219 A1* | 5/2024 | Dainese, Jr. ...... C03B 37/02781 |
| 2025/0197273 A1* | 6/2025 | Drake .............. C03B 37/02781 |

FOREIGN PATENT DOCUMENTS

| | | |
|---|---|---|
| GB | 2526879 A | 12/2015 |
| WO | 2003/050571 A2 | 6/2003 |
| WO | 2020/210208 A1 | 10/2020 |
| WO | 2021/009239 A1 | 1/2021 |

OTHER PUBLICATIONS

Amrani, et al., "Low-loss single-mode hybrid-lattice hollow-core photonic-crystal fibre", Light: Science & Applications, vol. 10, No. 1, 2021, pp. 1-12.

B. Temelkuran et al., "Wavelength-scalable hollow optical fibres with large photonic bandgaps for CO2 laser transmission", Nature, vol. 420, 2002, pp. 650-653.

C. Wei et al., "Negative curvature fibers", Advances in Optics and Photonics, vol. 9, 2017, pp. 504-561.

E. N. Fokoua, et al., "Analysis of light scattering from surface roughness in hollowcore photonic bandgap fibers," Opt. Express, vol. 20, No. 19, 2012, pp. 20980-20991.

F. Poletti, "Nested antiresonant nodeless hollow core fiber", Opt. Express, vol. 22, 2014, pp. 23807-23828.

G. T. Jasion et al., "Hollow Core NANF with 0.28 dB/km Attenuation in the C and L Bands", paper Th4B.4, OFC 2020.

Hayashi et al., "Numerical modeling of a hybrid hollow-core fiber for enhanced mid-infrared guidance", Optics Express, vol. 29, 2021, pp. 17042-17052.

International Search Report and Written Opinion of the International Searching Authority; PCT/US2023/028628; dated Nov. 17, 2023; 12 pages; European Patent Office.

P. St.J. Russell, "Photonic-cystal fibers," J. Lightwave Technol. vol. 24, 2006, pp. 4729-4749.

P. Yeh, et al., "Theory of Bragg fiber", Opt. Soc. Am., vol. 68, 1978, pp. 1196-1201.

Poletti, "Nested Antiresonant Nodeless Hollow Core Fiber", Opt. Express, vol. 22, 2014, pp. 23807-23828.

S. G. Johnson et al., "Low-loss asymptotically single-mode propagation in large-core OmniGuide fibers", Opt. Express, vol. 9, 2001, pp. 748-779.

Sakr et al., "Hollow Core NANFs with Five Nested Tubes and Record Low Loss at 850, 1060, 1300 and 1625nm", OFC 2021,.

Selim et al: "Single-mode, low loss hollow-core anti-resonant fiber designs", Optics Express, vol. 27, No. 4, Feb. 18, 2019 (Feb. 18, 2019), 13 pages.

Shaha, et al., "Low loss double cladding nested hollow core antiresonant fiber", OSA Continuum, vol. 3, No. 9, 2020, pp. 2512-2524.

Shemuly, et al., "Asymmetric wave propagation in planar chiral fibers", Optics express, vol. 21, No. 2, 2013, pp. 1465-1472.

Y. Xu et al., "Asymptotic Matrix Theory of Bragg Fibers" J. of Lightwave Technol., vol. 20, 2002, pp. 428-440.

Yang, et al., "Low Loss Hollow-Core Connecting-Circle Negative-Curvature Fibres", IEEE Photonics Journal, vol. 13, No. 1, 2021, pp. 1-10.

Yurii A et al: "Hollow core Bragg fiber with antiresonant intermediate layer", Proceedings of SPIE, vol. 10176, Nov. 9, 2016, pp. 101760L-101760L.

Zhu, et al., "Low loss hollow-core antiresonant fiber with nested supporting rings", Optics Express, vol. 29, No. 2, 2021, pp. 1659-1665.

Hu et al., "Design of Negative Curvature Hollow Core Fiber Based on Reinforcement Learning." Journal of Lightwave Technology 38, No. 7 (2020), pp. 1959-1965.

Khashan et al., "Dispersion of the optical constants of quartz and polymethyl methacrylate glasses in a wide spectral range: 0.2-3 μm." Optics Communications 188, No. 1-4 (2001), pp. 129-139.

Liu et al., "Fabrication and sensing applications of special microstructured optical fibers." Selected Topics on Optical Fiber Technologies and Applications; Xu, F., Mou, C., Eds (2017), pp. 1-20.

\* cited by examiner

HOLLOW-CORE OPTICAL FIBERS AND METHODS FOR PRODUCING THE SAME

This application claims the benefit of priority under 35 U.S.C § 120 of U.S. Provisional Application Ser. No. 63/467,087 filed on May 17, 2023, U.S. Provisional Application Ser. No. 63/467,064 filed on May 17, 2023, and U.S. Provisional Application Ser. No. 63/394,126 filed on Aug. 1, 2022, the content of which is relied upon and incorporated herein by reference in its entirety.

FIELD

The present specification generally relates to hollow-core optical fibers and methods for producing hollow-core optical fibers.

TECHNICAL BACKGROUND

Hollow-core optical fibers transmit light through a hollow core. Some hollow-core optical fibers include capillaries as cladding elements, but manufacturing such hollow-core optical fibers may be difficult. Specifically, using capillaries as the cladding elements may limit the possible structures that may be used in the preform and in the hollow-core optical fibers. Additionally, it may be difficult to precisely place multiple capillaries within a preform during the process of manufacturing hollow-core optical fibers. Accordingly, there is a need for improved hollow-core optical fibers and methods for manufacturing hollow-core optical fibers.

SUMMARY

According to a first aspect of the present disclosure, a method for producing a hollow-core optical fiber comprises rolling a glass sheet to form a rolled-glass structure; and attaching one or more of the rolled-glass structures to an inner surface of an annular support structure to form a hollow-core preform, wherein the inner surface of the annular support structure defines an interior cavity and the one or more of the rolled-glass structures are positioned within the interior cavity.

A second aspect of the present disclosure may include the first aspect, wherein the rolled-glass structure comprises greater than or equal to 2 and less than or equal to 15 turns.

A third aspect of the present disclosure may include the second aspect, wherein one or more turns of the rolled-glass structure are closed by an inner surface of the rolled-glass structure contacting an outer surface of the rolled-glass structure or an end of the rolled-glass structure.

A fourth aspect of the present disclosure may include the second aspect or the third aspect, wherein one or more turns of the rolled-glass structure are closed by an inner surface or an end of the rolled-glass structure contacting an outer surface of the rolled-glass structure.

A fifth aspect of the present disclosure may include any of the second through fourth aspects, wherein each turn of the rolled-glass structure is closed.

A sixth aspect of the present disclosure may include any of the first through fifth aspects, wherein a single rolled-glass structure is positioned within the interior cavity of the annular support structure.

A seventh aspect of the present disclosure may include any of the first through fifth aspects, wherein greater than or equal to 3 and less than or equal to 8 rolled-glass structures are positioned within the interior cavity of the annular support structure.

An eighth aspect of the present disclosure may include the seventh aspect, wherein the rolled-glass structures are spaced apart from adjacent rolled-glass structures in a circumferential direction about a central longitudinal axis of the annular support structure.

A ninth aspect of the present disclosure may include any of the first through eighth aspects, wherein the glass sheet has a thickness greater than or equal to 50 $\mu$m and less than or equal to 1000 $\mu$m.

A tenth aspect of the present disclosure may include any of the first through ninth aspects, wherein the glass sheet has a width greater than or equal to 0.5 m and less than or equal to 2 m.

An eleventh aspect of the present disclosure may include any of the first through tenth aspects, wherein the glass sheet is rolled along a length of the glass sheet.

A twelfth aspect of the present disclosure may include any of the first through eleventh aspects, wherein the glass sheet is formed from a silica-based glass.

A thirteenth aspect of the present disclosure may include the twelfth aspect, wherein the silica-based glass comprises one or more dopants.

A fourteenth aspect of the present disclosure may include the thirteenth aspect, wherein the one or more dopants are selected from Cl, F, $B_2O_3$, $P_2O_5$, and $GeO_2$.

A fifteenth aspect of the present disclosure may include any of the twelfth through fourteenth aspects, wherein the silica-based glass has an extinction coefficient of less than or equal to $1\times10^{-8}$.

A sixteenth aspect of the present disclosure may include any of the first through fifteenth aspects, wherein rolling the glass sheet to form the rolled-glass structure comprises: rolling a glass sheet on itself to for a roll of wound glass; heating the roll of wound glass to a temperature greater than a softening point of the glass of the glass sheet; and cooling the roll of wound glass after the heating to form the rolled-glass structure.

A seventeenth aspect of the present disclosure may include any of the first through sixteenth aspects, wherein the method further comprises a preliminary step of forming the glass sheet.

An eighteenth aspect of the present disclosure may include the seventeenth aspect, wherein the forming comprises: pressing glass-based soot into a soot sheet preform; heating the soot sheet preform to form a glass sheet preform; and drawing the glass sheet preform into the glass sheet.

A nineteenth aspect of the present disclosure may include the seventeenth aspect, wherein the forming comprises: depositing glass-based soot on a substrate; and sintering the glass-based soot on the substrate to form a glass sheet preform; and drawing the glass sheet preform into the glass sheet.

A twentieth aspect of the present disclosure may include any of the first through nineteenth aspects, wherein the method further comprises a preliminary step of imparting a pattern to the glass sheet.

A twenty-first aspect of the present disclosure may include the twentieth aspect, wherein the pattern comprises a plurality of slots extending through the glass sheet.

A twenty-second aspect of the present disclosure may include the twenty-first aspect, wherein the plurality of slots repeat periodically along a length of the glass sheet.

A twenty-third aspect of the present disclosure may include the twenty-first aspect or the twenty-second aspect, wherein the plurality of slots comprises slots extending from a first side of the glass sheet and slots extending from a second side of the glass sheet, wherein the slots extending from the first side of the glass sheet are offset from the slots extending from the second side of the glass sheet along a length of the glass sheet.

A twenty-fourth aspect of the present disclosure may include any of the twenty-first through twenty-third aspects, wherein the plurality of slots comprise slots spaced apart from a first side of the glass sheet and the second side of the glass sheet.

A twenty-fifth aspect of the present disclosure may include any of the twenty-first through twenty-fourth aspects, wherein the plurality of slots comprises: slots extending from a first side of the glass sheet; slots extending from a second side of the glass sheet; and slots spaced apart from a first side of the glass sheet and the second side of the glass sheet, wherein the slots extending from the first side of the glass sheet are offset from the slots extending from the second side of the glass sheet along a length of the glass sheet, and the slots spaced apart from a first side of the glass sheet and the second side of the glass sheet are offset from the slots extending from the first side of the glass sheet and the slots extending from the second side of the glass sheet along a length of the glass sheet.

A twenty-sixth aspect of the present disclosure may include any of the twenty-first to the twenty-fifth aspects, wherein a width of a slot is greater than or equal to 0.1 mm and less than or equal to 5 mm, and a length of the slot is greater than or equal to 1 cm and less than or equal to 50 cm.

According to a twenty-seventh aspect of the present disclosure, a method of forming a hollow-core optical fiber comprises drawing an optical fiber from a hollow-core optical fiber preform, the hollow-core optical fiber preform comprising: an annular support structure having an inner surface defining an interior cavity; and one or more rolled-glass structures attached to the inner surface and positioned within the interior cavity.

A twenty-eighth aspect of the present disclosure may include the twenty-seventh aspect, wherein the drawing the hollow-core preform to form a hollow-core optical fiber comprises drawing the hollow-core preform into a cane and drawing the cane into the hollow-core optical fiber.

A twenty-ninth aspect of the present disclosure may include the twenty-eighth aspect, wherein the hollow-core optical fiber comprises a hollow core extending along a central longitudinal axis of the hollow-core optical fiber and one or more rolled-glass cladding elements surrounding the hollow core, the rolled-glass cladding elements formed from the rolled-glass structures and configured to confine an optical signal in the hollow core.

According to a thirtieth aspect of the present disclosure, a hollow-core optical fiber comprises a substrate, the substrate comprising a tubular shape and an inner surface surrounding a central longitudinal axis of the hollow-core optical fiber; a hollow core extending through the substrate along the central longitudinal axis of the hollow-core optical fiber; a cladding positioned between the central longitudinal axis of the hollow-core optical fiber and the substrate, the cladding comprising a rolled-glass cladding element positioned around the central longitudinal axis, wherein the rolled-glass cladding element comprises a plurality of turns around the central longitudinal axis.

A thirty-first aspect of the present disclosure may include the thirtieth aspect, wherein the rolled-glass cladding element comprises greater than or equal to 2 and less than or equal to 15 turns.

A thirty-second aspect of the present disclosure may include the thirty-first aspect, wherein one or more turns of the rolled-glass cladding element are closed by an interior surface of the rolled-glass cladding element contacting an exterior surface of the rolled-glass cladding element or an end of the rolled-glass cladding element.

A thirty-third aspect of the present disclosure may include the thirty-first aspect or the thirty-second aspect, wherein one or more turns of the rolled-glass cladding element are closed by an interior surface of the rolled-glass cladding element or an end of the rolled-glass cladding element contacting an exterior surface of the rolled-glass cladding element.

A thirty-fourth aspect of the present disclosure may include any of the thirty-first through thirty-third aspects, wherein each turn of the rolled-glass cladding element is closed.

A thirty-fifth aspect of the present disclosure may include the thirty-first aspect, wherein each turn of the rolled-glass cladding element is open.

A thirty-sixth aspect of the present disclosure may include any of the thirtieth through thirty-fifth aspects, wherein the rolled-glass cladding element comprises a plurality of slots such that the rolled-glass cladding element is discontinuous in a cross-section of the hollow-core optical fiber perpendicular to the central longitudinal axis.

A thirty-seventh aspect of the present disclosure may include the thirty-sixth aspect, wherein each of the plurality of slots extends in a direction parallel to the central longitudinal axis for a distance less than a length of the hollow-core optical fiber.

A thirty-eighth aspect of the present disclosure may include any of the thirtieth through thirty-seventh aspects, wherein the rolled-glass cladding element comprises silica-based glass.

A thirty-ninth aspect of the present disclosure may include any of the thirtieth through thirty-eighth aspects, wherein the substrate comprises silica-based glass.

A fortieth aspect of the present disclosure may include any of the thirtieth through thirty-ninth aspects, wherein the hollow core comprises one or more gasses.

A forty-first aspect of the present disclosure may include any of the thirtieth through fortieth aspects, wherein the hollow core consists essentially of air.

A forty-second aspect of the present disclosure may include any of the thirtieth through forty-first aspects, wherein the cladding provides an anti-resonant effect at the wavelength k, the anti-resonant effect operable to confine an optical signal at the wavelength k in the hollow core.

A forty-third aspect of the present disclosure may include the forty-second aspect, wherein the wavelength k is in a range from 350 nm to 12000 nm.

A forty-fourth aspect of the present disclosure may include the forty-second aspect or the forty-third aspect, wherein the cladding is configured such that a confinement loss of a fundamental mode of the optical signal propagating in the hollow-core optical fiber is less than 1 dB/km at the wavelength k, wherein the wavelength k is in a range from 1200 nm to 1800 nm.

DETAILED DESCRIPTION

Figures 1, 2A, 2B:
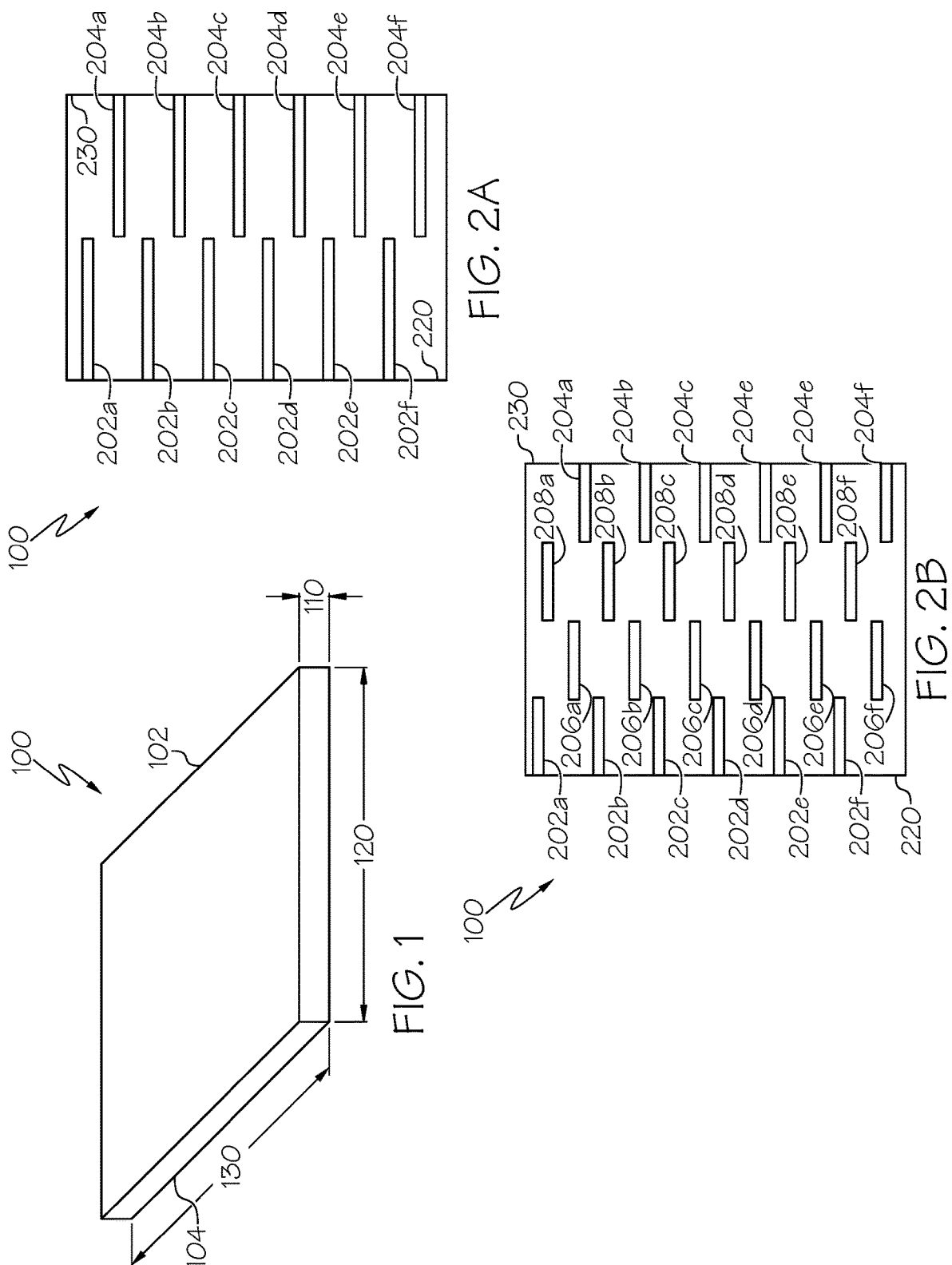
FIG. 1 schematically depicts a glass sheet according to one or more embodiments described herein.
FIG. 2A schematically depicts a glass sheet comprising a plurality of slots according to one or more embodiments described herein.
FIG. 2B schematically depicts a glass sheet comprising a plurality of slots according to one or more embodiments described herein.

Reference will now be made in detail to various embodiments of hollow-core optical fibers and methods of making the same. Whenever possible, the same reference numerals will be used throughout the drawings to refer to the same or like parts. In embodiments, methods for producing a hollow-core optical fiber comprise rolling a glass sheet on itself to from a roll of wound glass. The methods may include heating the roll of wound glass to a temperature greater than a softening point of the glass of the glass sheet, and cooling the roll of wound glass after the heating to form a rolled-glass structure. One or more rolled-glass structures may be attached to an inner surface of an annular support structure to form a hollow-core preform. The inner surface of the annular support structure defines an interior cavity and the one or more rolled-glass structures are positioned within the interior cavity. The methods for producing a hollow-core optical fiber comprise drawing the hollow-core preform into a hollow-core optical fiber.

In some embodiments, a hollow-core optical fiber may comprise a substrate, a hollow core extending through the substrate, and a cladding positioned between the hollow core and the substrate. The substrate comprises a tubular shape and an inner surface surrounding a central longitudinal axis of the hollow-core optical fiber. The hollow core extends through the substrate along the central longitudinal axis of the hollow-core optical fiber. The cladding comprises a rolled-glass structure positioned around the central longitudinal axis, and the rolled-glass structure comprises a plurality of turns around the central longitudinal axis.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Various components described herein may be referred to as "directly connected" or "indirectly connected". Components are directly connected when they are joined to one another with no intervening structure. Components may be joined by fusing, welding, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other.

As used herein, the singular forms "a," "an" and "the" include plural referents unless the context clearly dictates otherwise. Thus, for example, reference to "a" component includes aspects having two or more such components, unless the context clearly indicates otherwise.

Without intending to be bound by theory, an optical signal (i.e., light) may be passed through the hollow core of a hollow-core optical fiber. As used herein, "attenuation" refers to the reduction of intensity of the optical signal passing through the hollow-core optical fiber. Attenuation of the optical signal being guided through the hollow-core optical fiber may be reduced by various effects, including but not limited to, an anti-resonant effect. Each of these effects may reduce the leakage of light from the hollow core of the optical fiber to the cladding elements of the optical fiber, which in turn reduces the attenuation of the optical signal propagating in the hollow core. Said differently, each of these effects may improve the confinement of light to the hollow core of the optical fiber, thereby reducing the attenuation of the optical signal propagating in the hollow core. Embodiments of hollow-core optical fibers described herein may comprise structures that utilize one or more of these effects to reduce the attenuation of an optical signal passing through the hollow-core optical fiber.

As used herein, "anti-resonance" or an "anti-resonant effect" refers to an effect that occurs when the thickness of a material (e.g. the material used to form cladding elements) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of $2\pi$, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The anti-resonant effect may, in one embodiment, be satisfied by a material having a thickness given by Equation 1:

$$t_{AR} = \frac{(2m-1)\lambda}{4\sqrt{n^2-1}} \qquad \text{Equation 1}$$

In Equation 1, $t_{AR}$ is the thickness of the material that satisfies the anti-resonance condition, k is the wavelength of the optical signal, m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine or substantially confine light to the hollow core.

Hollow-core optical fibers may be produced by drawing a hollow-core preform into fiber. Some hollow-core optical fibers include capillaries as cladding elements or cladding elements that include capillaries. The capillaries may act to confine light to the hollow core of the fiber. The capillaries are formed from tubes in the preform used to form the hollow-core optical fiber. However, positioning multiple tubes within a preform with enough precision that the drawn hollow-core optical fiber has the correct structure may be difficult. Furthermore, it may be difficult to obtain suitable tubes for use in the production of hollow-core optical fiber preforms. Methods of producing hollow-core optical fibers discussed herein may use hollow-core optical fiber preforms with rolled-glass structures to make hollow-core optical fibers. This may provide for greater flexibility in the structure of the preform and hollow-core optical fibers, allowing for structures that cannot be formed from tubes. This may also reduce the complexity of making hollow-core preforms by circumventing the difficulties of precisely placing multiple glass tubes in the preforms and in forming nested tube structures.

Methods for producing hollow-core preforms and hollow-core optical fibers are now described in detail. In embodiments, methods for producing hollow-core preforms and hollow-core optical fibers may include rolling a glass sheet on itself to form a roll of wound glass, heating the roll of wound glass to the softening point of the glass and cooling the roll of wound glass to form a rolled-glass structure, attaching one or more rolled-glass structures to an annular support structure to form a hollow-core preform, and drawing the hollow-core preform into a hollow-core optical fiber. Each of these steps, and some additional steps that may be included in some embodiments of the methods for producing hollow-core optical fibers, are described below.

In some embodiments, methods for producing hollow-core preforms and hollow-core optical fibers may comprise a preliminary step of forming a glass sheet. In embodiments, the glass sheet is formed from a silica-based glass. The silica-based glass may comprise one or more dopants. In embodiments, the silica-based glass may comprise one or more dopants such as Cl, F, $B_2O_3$, $P_2O_5$, and $GeO_2$. Without intending to be bound by theory, dopants may modify the index of refraction and/or the viscosity of the silica-based glass.

The glass sheet may be formed by any suitable method. In embodiments, the glass sheet may be formed by pressing glass-based soot into a soot sheet preform, heating the soot sheet preform to sinter it into a glass sheet preform, and drawing the glass sheet preform into the glass sheet. For example, without limitation, the glass sheet may be formed by an outside vapor deposition method, where raw materials, dopants, and gasses are fed into a burner to form glass-based soot, the glass-based soot from the burner is collected and pressed into a soot sheet preform, and the soot sheet preform is heated to sinter it into a glass sheet preform, and the glass sheet preform is drawn into a glass sheet. In embodiments, the glass sheet may be formed by depositing glass-based soot on a substrate and sintering the glass-based soot on the substrate to form a glass sheet preform, and drawing the glass sheet preform to form a glass sheet. In embodiments, the substrate may be conveyed to allow for continuous or semi-continuous production of a glass sheet. The sintering may be performed by any suitable means, such as heat furnace sintering or laser sintering. In embodiments, the glass sheet may be formed by a glass melting and drawing process. In embodiments, the glass sheet is formed by fusion draw. Exemplary methods for forming glass sheets are described in detail in U.S. Pat. Nos. 8,181,485, 8,359,884, 8,438,876, and 10,185,084, the entire contents of which are incorporated by reference herein.

Referring now to FIG. 1, the glass sheet 100 may have a first major surface 102 opposite a second major surface 104. The glass sheet 100 may have a thickness 110. As described herein, the thickness of the glass sheet refers to the distance between the first major surface 102 of the glass sheet 100 and the second major surface 104 of the glass sheet 100. In embodiments the glass sheet 100 may have a width 120 and a length 130.

In embodiments, the glass sheet 100 has a thickness 110 greater than or equal to 50 µm and less than or equal to 300 µm. For example, without limitation, the glass sheet 100 may have a thickness 110 from 50 µm to 1000 µm, from 100 µm to 1000 µm, from 150 µm to 1000 µm, from 200 µm to 1000 µm, from 250 µm to 1000 µm, from 300 µm to 1000 µm, from 350 µm to 1000 µm, from 400 µm to 1000 µm, from 450 µm to 1000 µm, from 500 µm to 1000 µm, from 550 µm to 1000 µm, from 600 µm to 1000 µm, from 650 µm to 1000 µm, from 700 µm to 1000 µm, from 750 µm to 1000 µm, from 800 µm to 1000 µm, from 850 µm to 1000 µm, from 900 µm to 1000 µm, from 950 µm to 1000 µm, from 50 µm to 950 µm, from 50 µm to 900 µm, from 50 µm to 850 µm, from 50 µm to 800 µm, from 50 µm to 750 µm, from 50 µm to 700 µm, from 50 µm to 650 µm, from 50 µm to 600 µm, from 50 µm to 550 µm, from 50 µm to 500 µm, from 50 µm to 450 µm, from 50 µm to 400 µm, from 50 µm to 350 µm, from 50 µm to 300 µm, from 50 µm to 250 µm, from 50 µm to 200 µm, from 50 µm to 150 µm, from 50 µm to 100 µm, or any range or combination of ranges formed from these endpoints. In some embodiments, the glass sheet 100 may have a thickness 110 from 50 µm to 300 µm. Without intending to be bound by theory, when the glass sheet 100 has a thickness 110 from 50 µm to 1000 µm the glass sheet 100 may be flexible and may be rolled on itself without heating during the method to form the rolled-glass structure, as described in further detail herein. Without intending to be bound by theory, when hollow-core preforms include rolled-glass structures formed from glass sheet 100 having the thickness disclosed herein are used to make hollow-core optical fibers, the rolled-glass cladding elements of the hollow-core optical fiber derived from the rolled-glass structures during fiber draw may have a thickness that promotes confinement of light in the hollow core of the hollow-core optical fiber through the anti-resonant effect.

In embodiments, the glass sheet 100 may have a width 120 greater than or equal to 0.5 m and less than or equal to 2.0 m. For example, without limitation, the glass sheet 100 may have a width 120 from 0.5 m to 2.0 m, from 0.7 m to 2.0 m, from 0.9 m to 2.0 m, from 1.1 m to 2.0 m, from 1.3 m to 2.0 m, from 1.5 m to 2.0 m, from 1.7 m to 2.0 m, from 1.9 m to 2.0 m, from 0.5 m to 1.8 m, from 0.5 m to 1.6 m, from 0.5 m to 1.4 m, from 0.5 m to 1.2 m, from 0.5 m to 1.0 m, from 0.5 m to 0.8 m, from 0.5 m to 0.6 m, or any range or combination of ranges formed from these endpoints. In embodiments, the glass sheet 100 may have a length 130 greater than or equal to the width 120.

In some embodiments, methods for producing hollow-core preforms and hollow-core optical fibers may comprise a step of imparting a pattern to the glass sheet 100. The pattern may be imparted to the glass sheet by any suitable means. For example, without limitation, the pattern may be imparted to the glass sheet 100 by cutting and removing one or more portions of glass from the glass sheet 100. In one or more embodiments, the pattern may repeat periodically along a length 130 of the glass sheet 100.

Referring now to FIG. 2A, in embodiments, the pattern may comprise a plurality of slots (e.g., slots 202a, 202b, 202c, 202d, 202e, 202f, 204a, 204b, 204c, 204d, 204e, and 204f) extending through at least a portion of the glass sheet 100. In some embodiments, the plurality of slots may repeat periodically along the length 130 of the glass sheet 100. In some embodiments, the plurality of slots may comprise slots extending from a first side 220 of the glass sheet 100 (slots 202a, 202b, 202c, 202d, 202e, and 202f) and a plurality of slots extending from a second side 230 of the glass sheet 100 (slots 204a, 204b, 204c, 204d, 204e, and 204f). The slots extending from the first side 220 of the glass sheet 100 may be offset from the slots extending from the second side 230 of the glass sheet 100 along a length 130 of the glass sheet 100, as depicted in the embodiment of FIG. 2A. In embodiments, the first side 220 and second side 230 define the width 120 of the glass sheet 100.

Referring now to FIG. 2B, in some embodiments, the pattern may comprise a plurality of slots (e.g., slots 206a, 206b, 206c, 206d, 206e, 206f, 208a, 208b, 208c, 208d, 208e, and 208f) that are spaced apart from the first side 220 of the glass sheet 100 and the second side 230 of the glass sheet 100. In some embodiments, the pattern may comprise slots extending from the first side 220 of the glass sheet 100, slots extending from the second side 230 of the glass sheet 100 and slots that are spaced apart from the first side 220 of the glass sheet 100 and the second side 230 of the glass sheet 100. In some embodiments, the glass sheet 100 may be free from slots extending from the first side 220 of the glass sheet 100, from the second side 230 of the glass sheet 100 or from the first side 220 of the glass sheet 100 and the second side 230 of the glass sheet 100.

In embodiments, the slots may have any suitable shape. For example, without limitation, the slots depicted in FIGS. 2A and 2B have a rectangular shape. However, it should be understood that slots shapes other than rectangular are contemplated and possible, such as race-track shaped slots, oval slots, or the like.

In embodiments, the slots may have any suitable dimensions such that once the glass sheets are rolled and subsequently drawn into the hollow-core optical fibers, the slots have the desired dimensions in the hollow-core optical fibers, as described in further detail herein. In embodiments, the slots may be spaced in any suitable manner such that such that once the glass sheets are rolled and subsequently drawn into the hollow-core optical fibers, the slots have the desired spacing in the hollow-core optical fibers, as described in further detail herein. Without intending to be bound by theory, the change in scale from the preform to the hollow-core optical fiber may be used to determine the size and spacing of the slots in the glass sheet. For example, if the change in scale between the preform and the hollow-core optical fiber is about 100 then the size and spacing of the slots may be determined using the same scaling.

In some embodiments, the width of a slot may be greater than or equal to 0.1 mm and less than or equal to 5 mm. For example, without limitation, the width of a slot may be from 0.1 mm to 5 mm, from 0.5 mm to 5 mm, from 1 mm to 5 mm, from 1.5 mm to 5 mm, from 2 mm to 5 mm, from 2.5 mm to 5 mm, from 3 mm to 5 mm, from 3.5 mm to 5 mm, from 4 mm to 5 mm, from 4.5 mm to 5 mm, from 0.1 mm to 4.5 mm, from 0.1 mm to 4 mm, from 0.1 mm to 3.5 mm, from 0.1 mm to 3 mm, from 0.1 mm to 2.5 mm, from 0.1 mm to 2 mm, from 0.1 mm to 1.5 mm, from 0.1 mm to 1 mm, from 0.1 mm to 0.5 mm, or any range or combination of ranges formed from these endpoints. In some embodiments, the length of a slot may be greater than or equal to 1 cm and less than or equal to 50 cm. For example, without limitation, the length of a slot may be from 1 cm to 50 cm, from 5 cm to 50 cm, from 10 cm to 50 cm, from 15 cm to 50 cm, from 20 cm to 50 cm, from 25 cm to 50 cm, from 30 cm to 50 cm, from 35 cm to 50 cm, from 40 cm to 50 cm, from 45 cm to 50 cm, from 1 cm to 45 cm, from 1 cm to 40 cm, from 1 cm to 35 cm, from 1 cm to 30 cm, from 1 cm to 25 cm, from 1 cm to 20 cm, from 1 cm to 15 cm, from 1 cm to 10 cm, from 1 cm to 5 cm, or any range or combination of ranges formed from these endpoints.

According to embodiments described herein, methods for producing a hollow-core optical fiber comprise rolling the glass sheet 100 on itself to form a roll of wound glass. In embodiments, the glass sheet may be flexible, such that the glass sheet may be rolled on itself without heating the glass sheet. In embodiments, the glass sheet 100 may be rolled on itself in a direction perpendicular to the width 120 of the glass sheet 100. In other words, the glass sheet 100 may be rolled along a length 130 of the glass sheet 100.

In embodiments, the methods for producing hollow-core preforms and hollow-core optical fibers may comprise heating the roll of wound glass to a temperature greater than the softening point of the glass of the glass sheet 100. As described herein the "softening point" refers to the temperature at which the glass has a viscosity of $10^{7.65}$ poise. In embodiments, the roll of wound glass may be cooled after the heating to form a rolled-glass structure. Without intending to be bound by theory, heating the roll of wound glass to the softening point of the glass and subsequently cooling the roll of wound glass may allow the rolled-glass structure to maintain the shape of the roll of wound glass after the heating and cooling.

In embodiments, the rolled-glass structure comprises greater than or equal to 2 and less than or equal to 15 turns. For example, without limitation, the rolled-glass structure may comprise 2, 3, 4, 5, 6, 7, 8, 9, 10, 11, 12, 13, 14, or even 15 turns. In embodiments, the rolled-glass structure may comprise from 2 to 15 turns, or from 2 to 8 turns, or from 4 to 8 turns, or from 4 to 15 turns. As used herein, "turn" refers to one revolution of rolling of the glass sheet 100 (i.e., rolling by 360°).

In embodiments, one or more turns of the rolled-glass structure are closed by an inner surface of the rolled-glass structure contacting an outer surface of the rolled-glass structure or an end of the rolled-glass structure. In embodiments, one or more turns of the rolled-glass structure may be closed by an inner surface or an end of the rolled-glass structure contacting an outer surface of the rolled-glass structure. In some embodiments, each turn of the rolled-glass structure is closed. In some embodiments, no turns of the rolled-glass structure are closed. Exemplary structures of rolled-glass structures are depicted in FIGS. 3-6. It should be noted that the rolled-glass structures of the present disclosure are not limited solely to the rolled-glass structures depicted in FIGS. 3-6.

Figure 3:
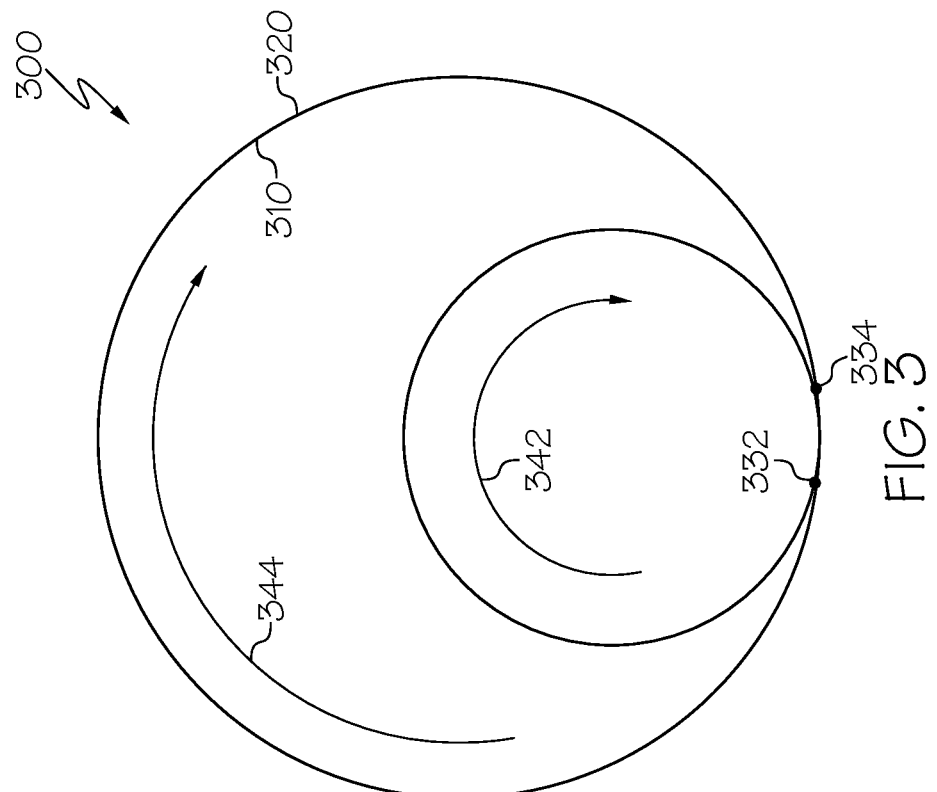
FIG. 3 schematically depicts a rolled-glass structure according to one or more embodiments described herein.

Referring now to FIG. 3, rolled-glass structure 300 comprises an inner surface 310 and an outer surface 320. The rolled-glass structure 300 further comprises a first end 332 and a second end 334. The rolled-glass structure depicted in FIG. 3 may be formed by rolling a glass sheet 100 from the first end 332 in a direction depicted by arrow 342 until an inner surface 310 of the rolled-glass structure 300 contacts the first end 332 of the rolled-glass structure 300. The glass sheet 100 may be further rolled in the direction depicted by arrow 344 until the second end 334 of the rolled-glass structure 300 contacts the outer surface 320 of the rolled-glass structure 300. In the embodiment depicted in FIG. 3, the rolled-glass structure 300 includes two turns and each turn is closed.

Figure 4:
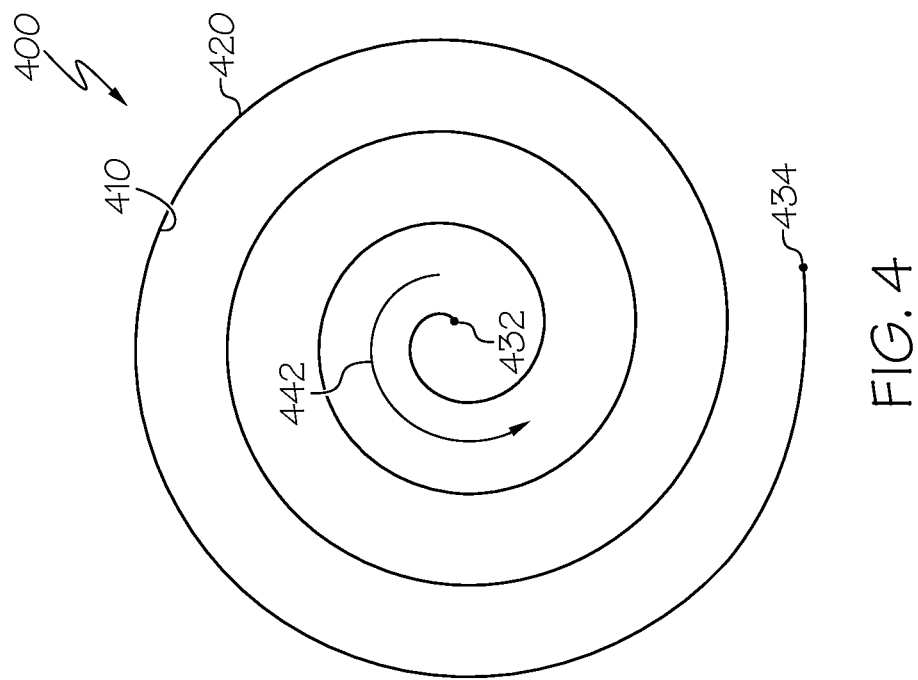
FIG. 4 schematically depicts a rolled-glass structure according to one or more embodiments described herein.

Referring now to FIG. 4, rolled-glass structure 400 comprises an inner surface 410 and an outer surface 420. The rolled-glass structure 400 further comprises a first end 432 and a second end 434. The rolled-glass structure 400 depicted in FIG. 4 may be formed by rolling a glass sheet 100 from the first end 432 in a direction depicted by arrow 442. The inner surface 410 and the outer surface 420 of rolled-glass structure 400 are spaced apart such that they do not contact each other. Additionally, the first end 432 and the second end 434 of the rolled-glass structure 400 are spaced apart from the inner surface 410 and the outer surface 420 such that the turns of the rolled-glass structure 400 remain open. In the embodiment depicted in FIG. 4, the rolled-glass structure 400 includes four turns and each turn is open.

Figures 5, 6:
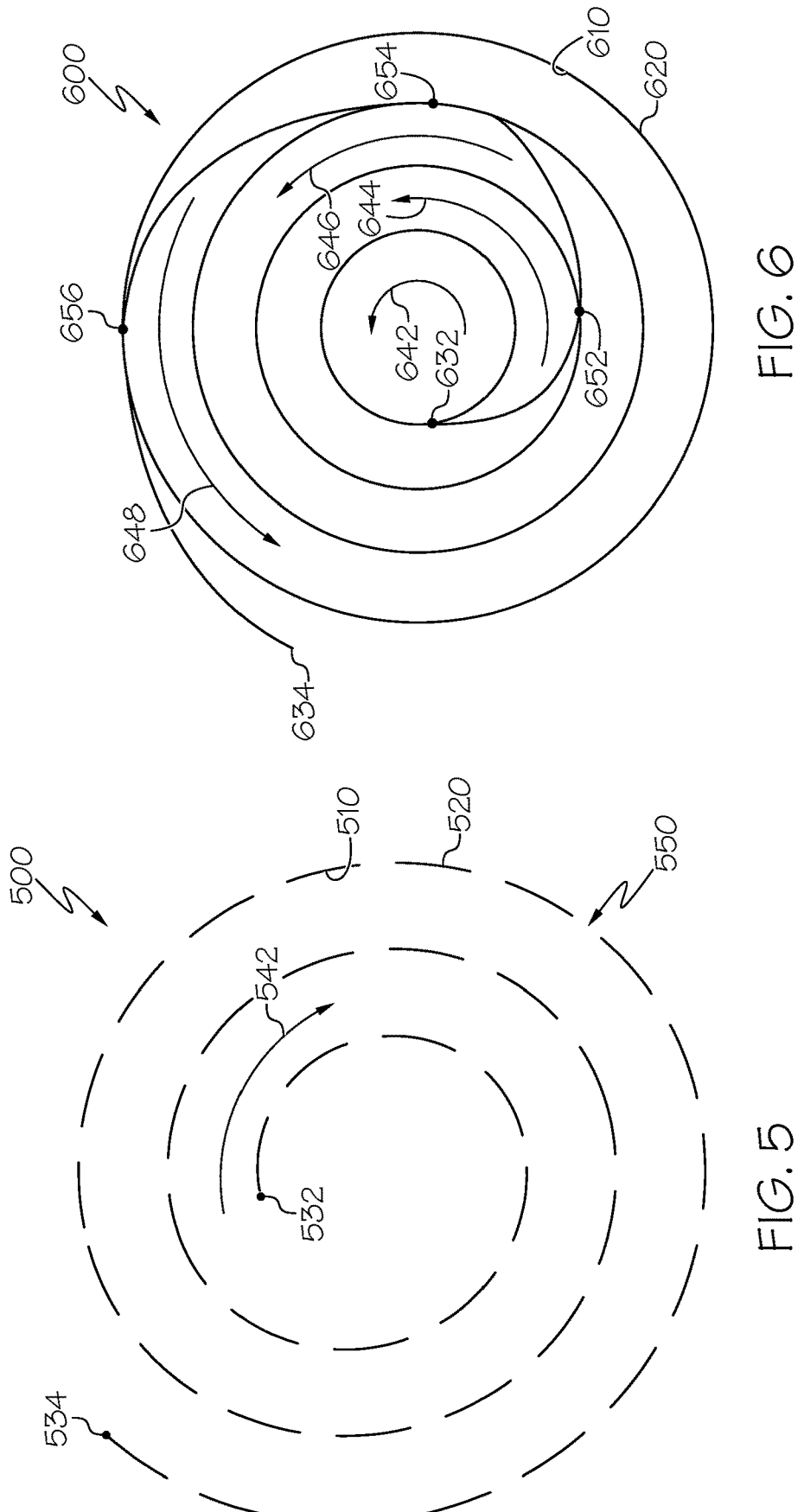
FIG. 5 schematically depicts a rolled-glass structure according to one or more embodiments described herein.
FIG. 6 schematically depicts a rolled-glass structure according to one or more embodiments described herein.

Referring now to FIG. 5, rolled-glass structure 500 comprises an inner surface 510 and an outer surface 520. The rolled-glass structure 500 further comprises a first end 532 and a second end 534. The rolled-glass structure 500 depicted in FIG. 5 may be formed by rolling a glass sheet 100 comprising a plurality of slots (see, e.g., FIGS. 2A and 2B) from the first end 532 in the direction depicted by arrow 542. The plurality of slots in the glass sheet 100 used to form the rolled-glass structure 500 result in a plurality of gaps 550 in the spiral on the cross section of the rolled-glass structure 500 depicted in FIG. 5. As shown in FIG. 5, the inner surface 510 and the outer surface 520 of the rolled-glass structure 500 are spaced apart such that they do not contact each other. Additionally, the first end 532 and the second end 534 of the rolled-glass structure 500 are spaced apart from the inner surface 510 and the outer surface 520 such that the turns of rolled-glass structure 500 remain open. In the embodiment depicted in FIG. 5, the rolled-glass structure 500 includes three turns and each turn is open.

Referring now to FIG. 6, rolled-glass structure 600 comprises an inner surface 610 and an outer surface 620. The rolled-glass structure 600 further comprises a first end 632 and a second end 634. The rolled-glass structure 600 depicted in FIG. 6 may be formed by rolling a glass sheet 100 from the first end 632 in a direction depicted by arrow 642 until the inner surface 610 contacts the first end 632. The glass sheet 100 may be rolled in the direction of arrow 644 until the inner surface 610 contacts the outer surface 620 at point 652. The glass sheet 100 may continue to be rolled in the direction of arrow 646 until the inner surface 610 contacts the outer surface 620 at point 654. The glass sheet 100 may continue to be rolled in the direction of arrow 648 until the inner surface 610 contacts the outer surface 620 at point 656. In the embodiment depicted in FIG. 6, the rolled-glass structure 600 includes four turns and each turn is closed.

Figure 7:
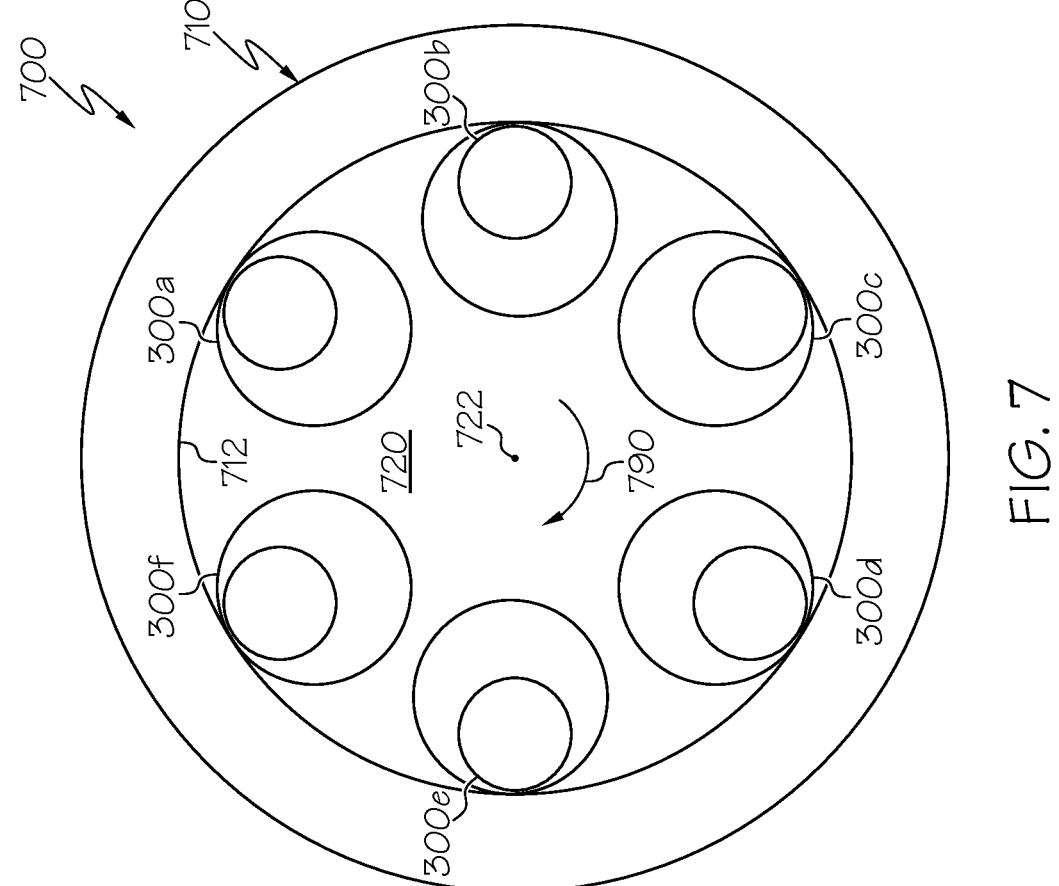
FIG. 7 schematically depicts a hollow-core preform according to one or more embodiments described herein.

According to embodiments describe herein, the methods for producing hollow-core preforms and hollow-core optical fibers comprise attaching one or more of the rolled-glass structures to an inner surface of an annular support structure to form a hollow-core preform. Referring now to FIG. 7, a hollow-core preform 700 comprises an annular support structure 710. In embodiments, the inner surface 712 of the annular support structure 710 may define an interior cavity 720 and the one or more rolled-glass structures 300 (rolled-glass structures 300a, 300b, 300c, 300d, 300e, and 300f in the embodiment of FIG. 7) may be positioned within the interior cavity 720 of the annular support structure 710. It is contemplated that any rolled-glass structure described herein may be used in the hollow-core preform 700 described herein. For example, without limitation, the rolled-glass structure may be rolled-glass structure 300, rolled-glass structure 400, rolled-glass structure 500, rolled-glass structure 600, or any other suitable rolled-glass structure. In embodiments, the annular support structure 710 may have a central longitudinal axis 722. The inner surface 712 of the annular support structure 710 may surround the central longitudinal axis 722, and the interior cavity 720 of the annular support structure 710 may extend through the annular support structure 710 along the central longitudinal axis 722.

In embodiments, from 3 to 11 rolled-glass structures are positioned within the interior cavity 720 of the annular support structure. For example, without limitation, 3, 4, 5, 6, 7, 8, 9, 10, or 11 rolled-glass structures may be positioned within the interior cavity 720 of the annular support structure 710. In embodiments, each rolled-glass structure may be connected to the inner surface 712 of the annular support structure 710. For example, without limitation, each rolled-glass structure may be fused to the inner surface 712 of the annular support structure 710 during production of the hollow-core preform 700.

The rolled-glass structures positioned within the interior cavity 720 of the annular support structure 710 may be spaced apart from adjacent rolled-glass structures in a circumferential direction 790 about the central longitudinal axis 722 of the annular support structure 710. That is, each rolled-glass structure in the hollow-core preform 700 is not in contact with another rolled-glass structure in the hollow-core preform 700. For example, in the embodiment depicted in FIG. 7, rolled-glass structure 300a is spaced apart from rolled-glass structure 300b, such that rolled-glass structure 300a is not in contact with rolled-glass structure 300b.

In one or more embodiments, the hollow-core preform 700 may comprise a single rolled-glass structure positioned within the interior cavity 720. The single rolled-glass structure may be connected to the inner surface 712 of the annular support structure 710 by any suitable means. For example, without limitation, the rolled-glass structure may be fused to the inner surface 712 of the annular support structure 710. Referring now to FIG. 8A, rolled-glass structure 500 is positioned within the interior cavity 720 of annular support structure 710 and is attached to inner surface 712. Second end 534 of rolled-glass structure 500 may contact the inner surface 712 of the annular support structure 710. In embodiments, one or more supports (not depicted) may contact the outer surface 520 of the rolled-glass structure 500 and the inner surface 712 of the annular support structure 710 to provide additional structural support for the rolled-glass structure 500. The one or more supports may comprise silica-based glass and may be in any suitable shape, including but not limited to a tubes, cylinders, ribs, or blocks.

Figure 8B:
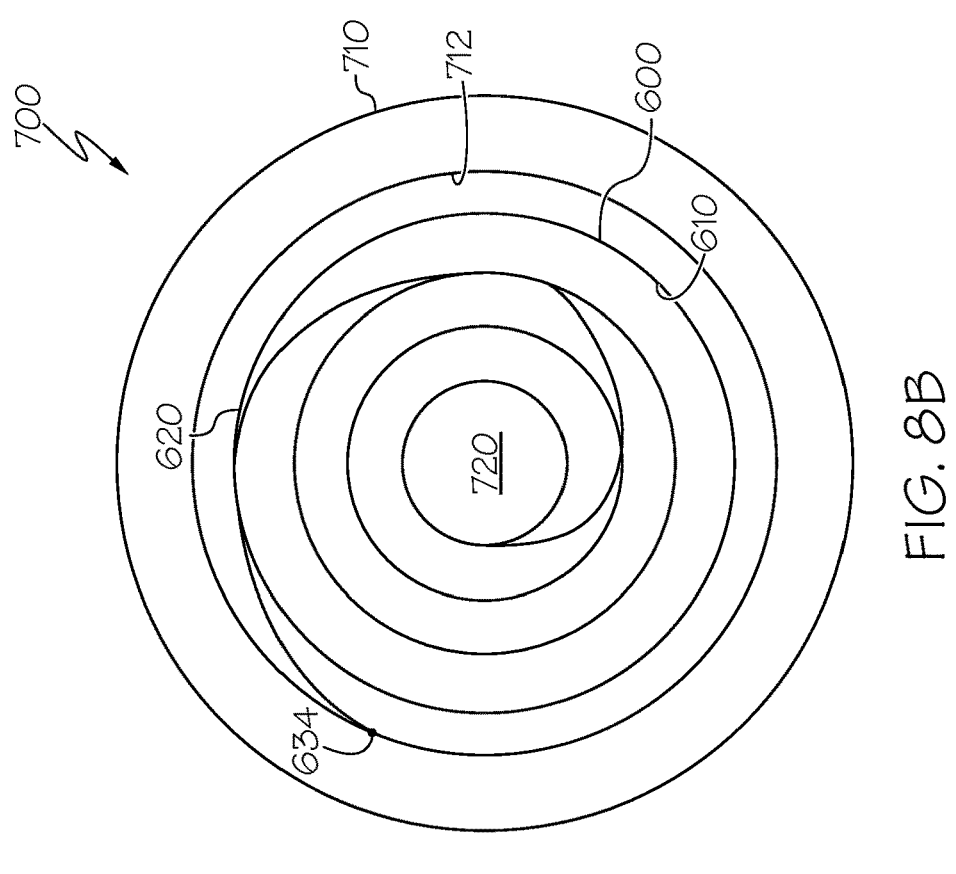
FIG. 8B schematically depicts a hollow-core preform according to one or more embodiments described herein.
Figure 8A:
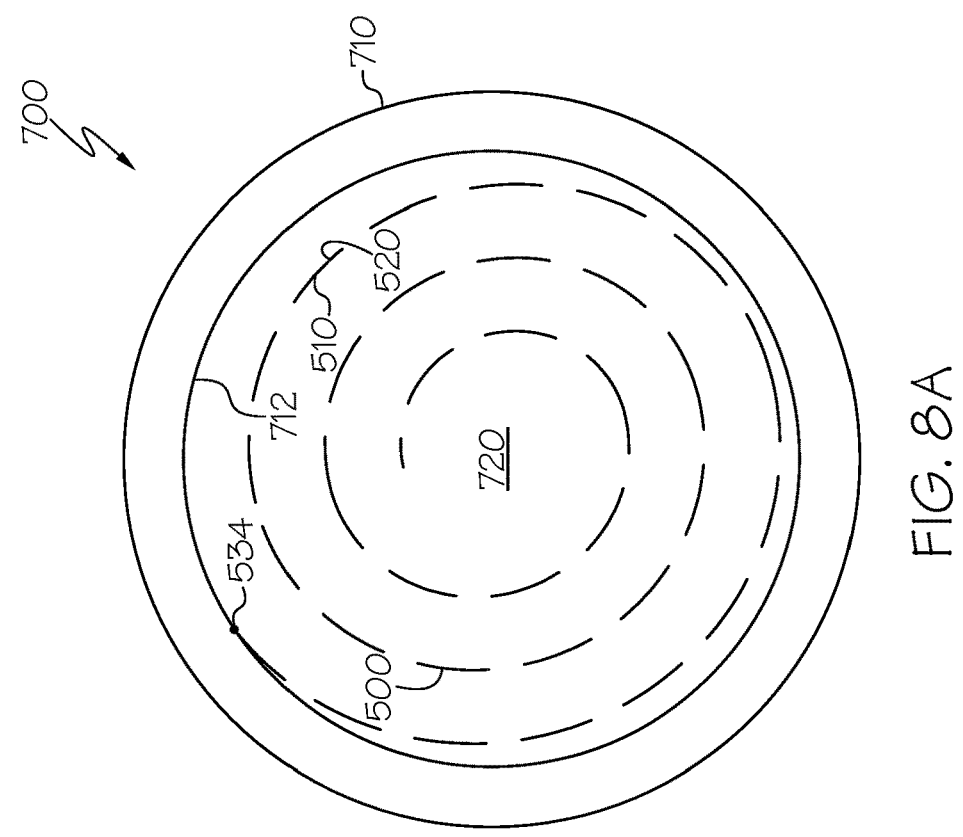
FIG. 8A schematically depicts a hollow-core preform according to one or more embodiments described herein.

Referring now to FIG. 8B, rolled-glass structure 600 is positioned within the interior cavity 720 of annular support structure 710 and is attached to inner surface 712. Second end 634 of rolled-glass structure 600 may contact the inner surface 712 of the annular support structure 710. In embodiments, one or more supports (not depicted), as described hereinabove may contact the outer surface 620 of rolled-glass structure 600 and the inner surface 712 of the annular support structure to provide additional structural support for the rolled-glass structure 600.

In embodiments, various components of the hollow-core preform 700 may comprise silica-based glass. Silica-based glass may include pure silica or silica that is doped with one or more dopants to modify the index of refraction or the viscosity of the silica. In embodiments, the annular support structure 710 may comprise silica-based glass. In embodiments, the one or more rolled-glass structures comprise silica-based glass. Furthermore, in embodiments, both the annular support structure 710 and the one or more rolled-glass structures may comprise silica-based glass.

In embodiments, the interior cavity 720 of the hollow-core preform 700 may comprise a gas. For example, without limitation, the interior cavity 720 may comprise air. In embodiments, the interior cavity 720 may consist essentially of or even consist of air. In some embodiments, the interior cavity 720 may consist essentially of or even consist of an inert gas. As described herein, an inert gas refers to any gas that non-reactive during the drawing process. Inert gasses may include, but are not limited to, nitrogen, argon, and helium. For example, without limitation, the interior cavity 720 may consist essentially of one or more of nitrogen, argon, and helium.

According to embodiments describe herein, the methods for producing a hollow-core optical fiber comprise drawing the hollow-core preform 700 into a hollow-core optical fiber. The hollow-core preform 700 may be drawn into hollow-core optical fiber using any suitable means. For example, without limitation, the hollow-core preform 700 may be drawn into optical fiber in a draw production system 900, schematically depicted in FIG. 9. The draw production system 900 includes a draw furnace 902 that is heated to an elevated temperature (e.g., greater than 1000° C.). The hollow-core preform 700 is disposed vertically in the draw furnace 902 and the draw furnace 902 supplies heat to the hollow-core preform 700. In embodiments, the draw furnace 902 may have a hot zone from about 0.5 inches to about 1 inch positioned toward the bottom of hollow-core preform 700 heated to a temperature sufficient to soften the draw (lower) end of hollow-core preform 700 (e.g. a temperature of 1700° C. or higher); however, it should be understood that draw furnaces having larger or smaller hot zones may be used in the methods for producing hollow-core optical fiber described herein.

The draw production system 900 comprises a manifold 920 attached to the hollow-core preform 700. The manifold 920 may be attached to the end of the hollow-core preform that is opposite the draw end of the hollow-core preform 700. The manifold 920 may be fluidly connected to a gas supply 922, and the manifold 920 may be operable to supply gas to the hollow core of hollow-core preform 700. The flow of gas from gas supply 922 to the hollow-core preform 700 via manifold 920 may be controlled to regulate the pressure of the hollow core of the hollow-core preform 700 during the drawing process. The flow of gas from the gas supply 922 to the hollow-core preform 700 may be controlled by any suitable means. For example, without limitation, the flow rate of gas from the gas supply to the hollow-core preform 700 may be controlled manually or by an automated control system.

During the drawing of optical fiber, the optical fiber 10 is pulled from a bottom portion (softened draw end) of hollow-core preform 700 by tractor 906. After leaving the draw furnace 902, the optical fiber 10 encounters a diameter monitoring device 908 that provides a signal used in a feedback control loop to regulate a speed of tractor 906 and maintain a constant fiber diameter. The optical fiber 10 then passes through a fiber tension measurement device 910 that measures the tension of the optical fiber 10 and provides a feedback control loop to regulate the tension of optical fiber 10 and maintain a desired draw tension setting.

Figure 9:
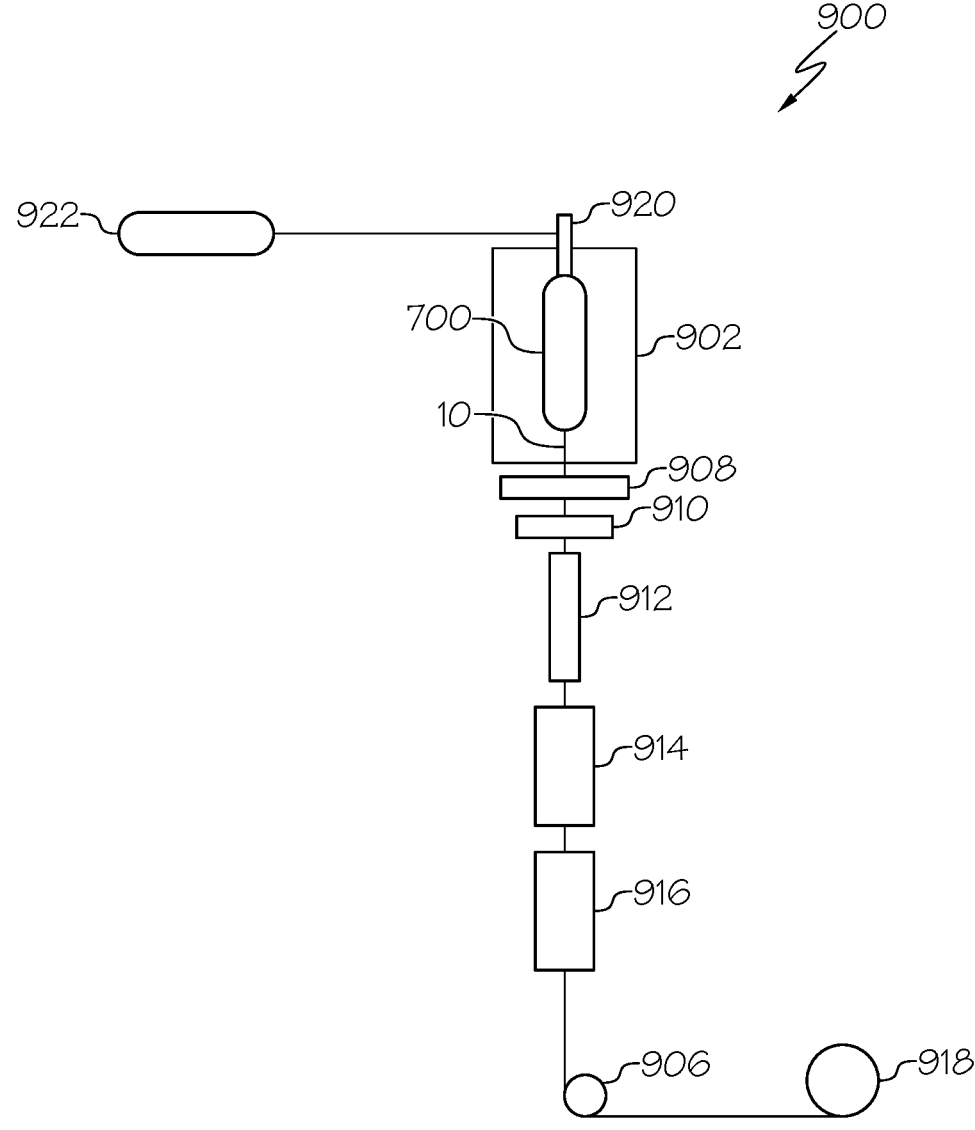
FIG. 9 schematically depicts a draw production system according to one or more embodiments described herein.

Still referring to FIG. 9, once the optical fiber 10 is drawn from hollow-core preform 700, the optical fiber 10 is cooled in a cooling tube 912 or other controlled cooling treatment device that may be coupled to or remote from the exit of the draw furnace 902, afterwards optical fiber 10 is coated by coater 914 that can apply a polymeric-based coating material to the outside surface of the optical fiber 10. The optical fiber 10 may also pass through a coating curing apparatus 916 that cures the polymeric coating (e.g. with ultraviolet light). The optical fiber 10 is then wound onto a spool or reel 918. Various optical attributes of the optical fiber, including the bandwidth are typically measured off-line.

In embodiments, the hollow-core preforms 700 described herein may be drawn into hollow-core optical fiber in multiple stages. For example, without limitation, the hollow-core preform 700 may be drawn into hollow-core optical fiber in two stages. In such embodiments, the hollow-core preform 700 may first be drawn into a cane. Then, the cane may then be drawn into hollow-core optical fiber.

Some embodiments of hollow-core optical fibers that may be produced by the previously described methods are now described in further detail. It should be noted that the hollow-core optical fibers that may be produced by the methods described hereinabove are not necessarily limited to the embodiments of hollow-core optical fibers described in further detail below.

Hollow-core optical fibers formed by drawing the hollow-core preforms described herein include a hollow core and one or more rolled-glass cladding elements. The hollow core extends along a central longitudinal axis of the hollow-core optical fiber and is derived from the hollow core of the hollow-core preform during draw. The rolled-glass cladding elements surround the hollow core of the hollow-core optical fiber and are derived from the rolled-glass structures of the hollow core preform during draw. As the hollow core preform is drawn to produce a hollow-core optical fiber, features of the hollow core preform are proportionately scaled down to the dimensions of the hollow-core optical fiber. Drawing of the hollow-core preform produces a hollow-core optical fiber with a diameter that is greatly reduced from the diameter of the hollow-core preform. Other dimensions of the hollow-core preform, such as the diameter of the hollow core and dimensions of the rolled-glass structures, are similarly reduced when forming the corresponding elements (hollow core, rolled-glass cladding elements) of the hollow-core optical fiber during the draw process.

Figures 10, 11:
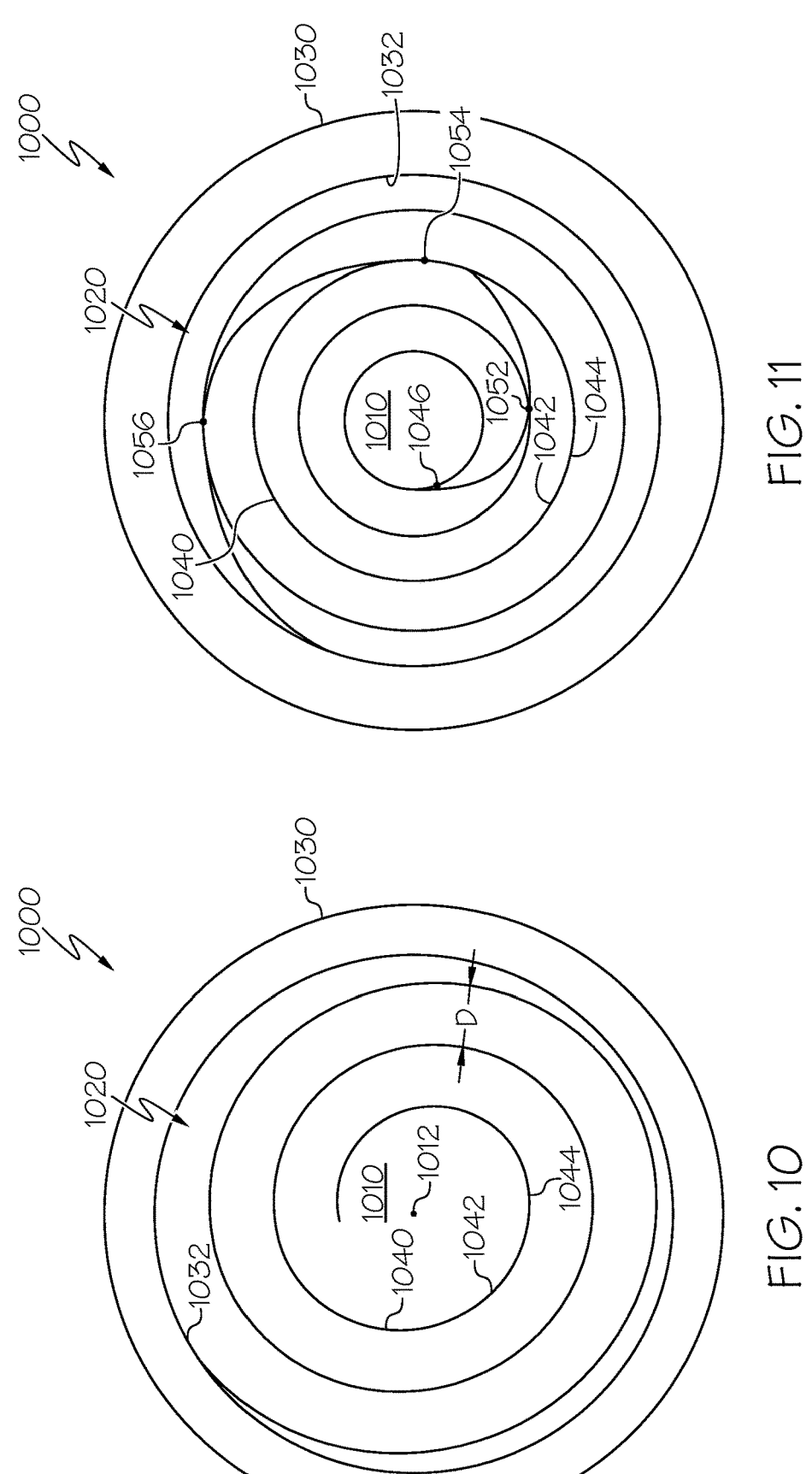
FIG. 10 schematically depicts a hollow-core optical fiber according to one or more embodiments described herein.
FIG. 11 schematically depicts a hollow-core optical fiber according to one or more embodiments described herein.

Referring now to FIG. 10, a hollow-core optical fiber 1000 may comprise substrate 1030. The substrate 1030 may comprise a tubular shape and an inner surface 1032 surrounding a central longitudinal axis 1012 of the hollow-core optical fiber 1000. The hollow-core optical fiber 1000 may comprise a hollow core 1010. The hollow core 1010 may extend through the substrate 1030 along the central longitudinal axis 1012 of the hollow-core optical fiber 1000. Generally, the hollow core 1010 is the light-guiding portion of the hollow-core optical fiber 1000. The hollow-core optical fiber 1000 may comprise a cladding 1020 with a rolled-glass cladding element 1040. The cladding 1020 may be operable to prevent the leakage of light out of the hollow core 1010, for example, by causing destructive interference of light passing through the rolled-glass cladding element 1040, resulting in light propagating in the hollow core 1010. Hollow core 1010 has a radius that extends in an orthogonal direction from the central longitudinal axis 1012 to the closest point of contact with a rolled-glass cladding element 1040 of cladding 1020. The diameter of the hollow core 1010 is twice the radius of the hollow core 1010. The diameter of hollow core 1010 is greater than or equal to 10 microns, or greater than or equal to 20 microns, or greater than or equal to 30 microns, or less than or equal to 60 microns, or less than or equal to 50 microns, or less than or equal to 40 microns, or in a range from 10 microns to 60 microns, or in a range from 20 microns to 50 microns, or in a range from 30 microns to 40 microns.

In embodiments, the substrate 1030 may comprise a tubular shape comprising an inner surface 1032 surrounding the central longitudinal axis 1012 of the hollow-core optical fiber 1000. The substrate 1030 may be operable to support any cladding elements included in the hollow-core optical fiber 1000. In embodiments, the outer diameter of the substrate 1030 may be from 100 m to 500 m. For example, without limitation, the outer diameter of the substrate 1030 may be from 100 m to 500 m, from 200 m to 500 m, from 300 m to 500 m, from 400 m to 500 m, from 100 m to 400 m, from 100 m to 300 m, from 100 m to 200 m, or any combination or subset of these ranges. In embodiments, the outer diameter of the substrate may be from 100 m to 250 m. In embodiments, the wall thickness of the substrate may be from 20 μm to 500 μm. For example, without limitation, the wall thickness of the substrate may be from 20 μm to 500 μm, from 100 μm to 500 μm, from 200 μm to 500 μm, from 300 μm to 500 μm, from 400 μm to 500 μm, from 20 μm to 400 μm, from 20 μm to 300 μm, from 20 μm to 200 μm, from 20 μm to 100 μm, or any combination or subset of these ranges.

In embodiments, one or more protective coatings (not depicted) may be positioned on an exterior surface of the substrate 1030. These coatings may be, for example, organic materials, such as plastics or polymers, and may protect the hollow-core optical fiber 1000 from the physical environment. The coatings may include a primary coating with a low Young's modulus (e.g. <1 MPa) surrounding and adjacent to the substrate 1030 and a secondary coating with a high Young's modulus (e.g. >1000 MPa) surrounding and adjacent to the primary coating. Representative materials for primary and secondary coatings include acrylate materials (e.g. urethane acrylates). In embodiments, a coated fiber may have an outer diameter of 242 microns, 200 microns, or 190 microns. In embodiments the thickness of the primary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns. In embodiments the thickness of the secondary coating in a radial direction is greater than 10 microns, or greater than 15 microns, or greater than 20 microns, or less than 45 microns, or less than 40 microns, or less than 35 microns, or in a range from 10 microns to 45 microns, or in a range from 15 microns to 40 microns, or in a range from 20 microns to 35 microns.

In embodiments, the cladding 1020 may be positioned between the central longitudinal axis 1012 of the hollow-core optical fiber 1000 and the substrate 1030. Still referring to FIG. 10, the cladding 1020 may comprise a rolled-glass cladding element 1040 circumscribing the central longitudinal axis 1012. The rolled-glass cladding element 1040 may comprise a plurality of turns around the central longitudinal axis 1012. Without intending to be bound by theory, using a single rolled-glass cladding element 1040 as the cladding 1020 of the hollow-core optical fiber 1000 may simplify the method of making the hollow-core optical fiber 1000 as only a single rolled-glass cladding element 1040 is positioned within the hollow core 1010.

In embodiments, the rolled-glass cladding element 1040 may comprise an interior surface 1042 and an exterior surface 1044. As described herein, a thickness of the rolled-glass cladding element 1040 refers to the distance between the interior surface 1042 of the rolled-glass cladding element 1040 and the exterior surface 1044 of the rolled-glass cladding element 1040. In embodiments, the rolled-glass cladding element 1040 may have a thickness from greater than or equal to 0.1 μm and less than or equal to 4.0 μm. For example, without limitation, the rolled-glass cladding element 1040 may have a thickness from 0.1 μm to 4.0 μm, from 0.3 μm to 4.0 μm, from 0.5 μm to 4.0 μm, from 0.7 μm to 4.0 μm, from 0.9 μm to 4.0 μm, from 1.1 μm to 4.0 μm, from 1.3 μm to 4.0 μm, from 1.5 μm to 4.0 μm, from 1.7 μm to 4.0 μm, from 1.9 μm to 4.0 μm, from 2.1 μm to 4.0 μm, from 2.3 μm to 4.0 μm, from 2.5 μm to 4.0 μm, from 2.7 μm to 4.0 μm, from 2.9 μm to 4.0 μm, from 3.1 μm to 4.0 μm, from 3.3 μm to 4.0 μm, from 3.5 μm to 4.0 μm, from 3.7 μm to 4.0 μm, from 3.9 μm to 4.0 μm, from 0.1 μm to 3.8 μm, from 0.1 μm to 3.6 μm, from 0.1 μm to 3.4 μm, from 0.1 μm to 3.2 μm, from 0.1 μm to 3.0 μm, from 0.1 μm to 2.8 μm, from 0.1 μm to 2.6 μm, from 0.1 μm to 2.4 μm, from 0.1 μm to 2.2 μm, from 0.1 μm to 1.0 μm, from 0.1 μm to 1.8 μm, from 0.1 μm to 1.6 μm, from 0.1 μm to 1.4 μm, from 0.1 μm to 1.2 μm, from 0.1 μm to 1.0 μm, from 0.1 μm to 0.8 μm, from 0.1 μm to 0.6 μm, from 0.1 μm to 0.4 μm, from 0.1 μm to 0.2 μm, or any range or combination of ranges formed from these endpoints. In embodiments, the rolled-glass cladding element 1040 may have a thickness of greater than or equal to 0.4 μm and less than or equal to 0.6 μm. In embodiments, the rolled-glass cladding element 1040 may have a thickness of greater than or equal to 0.35 μm and less than or equal to 1.2 μm. In embodiments, the rolled-glass cladding element 1040 may have a thickness, such as a thickness according to Equation 1, that promotes confinement of the optical signal in hollow core 1010 through an anti-resonant effect. Without intending to be bound by theory, when the rolled-glass 1040 has a wall thickness that provides an anti-resonant effect, attenuation of an optical signal passing through the hollow-core optical fiber 1000 may be reduced.

Still referring to FIG. 10, the rolled-glass cladding element 1040 may comprise greater than or equal to 2 and less than or equal to 15 turns. For example, without limitation, the rolled-glass cladding element 1040 may comprise 2, 3, 4, 5, 6, 7, 8, 9, 10, 11, 12, 13, 14 or 15 turns. In embodiments, the rolled-glass cladding element 1040 may comprise from 4 to 15 turns. In some embodiments, the rolled-glass cladding element 1040 may comprise from 2 to 8 turns, or from 4 to 8 turns. Without intending to be bound by theory, as the number of turns in the spiral increases, the number of layers having a thickness that satisfies the anti-resonant effect increases. This may improve the ability of the spiral to confine an optical signal to the hollow core of the fiber by the anti-resonant effect.

In embodiments, an interior surface 1042 of the rolled-glass cladding element 1040 and an adjacent exterior surface 1044 of the rolled-glass cladding element 1040 may be spaced apart by a distance D greater than or equal to 1 μm and less than or equal to 12 μm in a direction perpendicular to and passing through central longitudinal axis 1012. For example, without limitation, an interior surface 1042 of the rolled-glass cladding element 1040 and an adjacent exterior surface 1044 of the rolled-glass cladding element 1040 may be spaced apart in a direction perpendicular to and passing through central longitudinal axis 1012 by a distance D from 1 μm to 12 μm, from 2 μm to 12 μm, from 3 μm to 12 μm, from 4 μm to 12 μm, from 5 μm to 12 μm, from 6 μm to 12 μm, from 7 μm to 12 μm, from 8 μm to 12 μm, from 9 μm to 12 μm, from 10 μm to 12 μm, from 11 μm to 12 μm, from 1 μm to 11 μm, from 1 μm to 10 μm, from 1 μm to 9 μm, from 1 μm to 8 μm, from 1 μm to 7 μm, from 1 μm to 6 μm, from 1 μm to 5 μm, from 1 μm to 4 μm, from 1 μm to 3 μm, from 1 μm to 2 μm, or any range or combination of ranges formed from these endpoints. In some embodiments, the distance D may be from 4 μm to 11 μm.

In embodiments, one or more turns of the rolled-glass cladding element 1040 are closed. In embodiments, one or more turns of the rolled-glass cladding element 1040 may be closed by an interior surface 1042 of the rolled-glass cladding element 1040 contacting an exterior surface 1044 of the rolled-glass cladding element 1040 or an end of the rolled-glass cladding element 1040. In some embodiments, one or more turns of the rolled-glass cladding element 1040 may be closed by an interior surface 1042 or an end of the rolled-glass cladding element 1040 contacting an exterior surface 1044 of the rolled-glass cladding element 1040. In some embodiments, each turn of the rolled-glass cladding element 1040 may be closed. Referring now to FIG. 11, hollow-core optical fiber 1000 comprises a rolled-glass cladding element 1040 where each turn of the rolled-glass cladding element 1040 is closed. In the embodiment depicted in FIG. 11, the inner-most turn of the rolled-glass cladding element 1040 is closed where first end 1046 contacts the interior surface 1042 of the rolled-glass cladding element 1040. The remaining turns of the rolled-glass cladding element 1040 are closed at points 1052, 1054, and 1056, where the interior surface 1042 of the rolled-glass cladding element 1040 contacts the exterior surface 1044 of the rolled-glass cladding element.

In some embodiments, each turn of the rolled-glass cladding element 1040 is open. In such embodiments, the interior surface 1042 of the rolled-glass cladding element 1040 may be spaced apart from the exterior surface 1044 of the rolled-glass cladding element 1040 and the ends of the rolled-glass cladding element 1040 may be spaced apart from the interior surface 1042 and the exterior surface 1044 of the rolled-glass cladding element 1040. Referring again to FIG. 10, each turn of rolled-glass cladding element 1040 is open.

Figure 12:
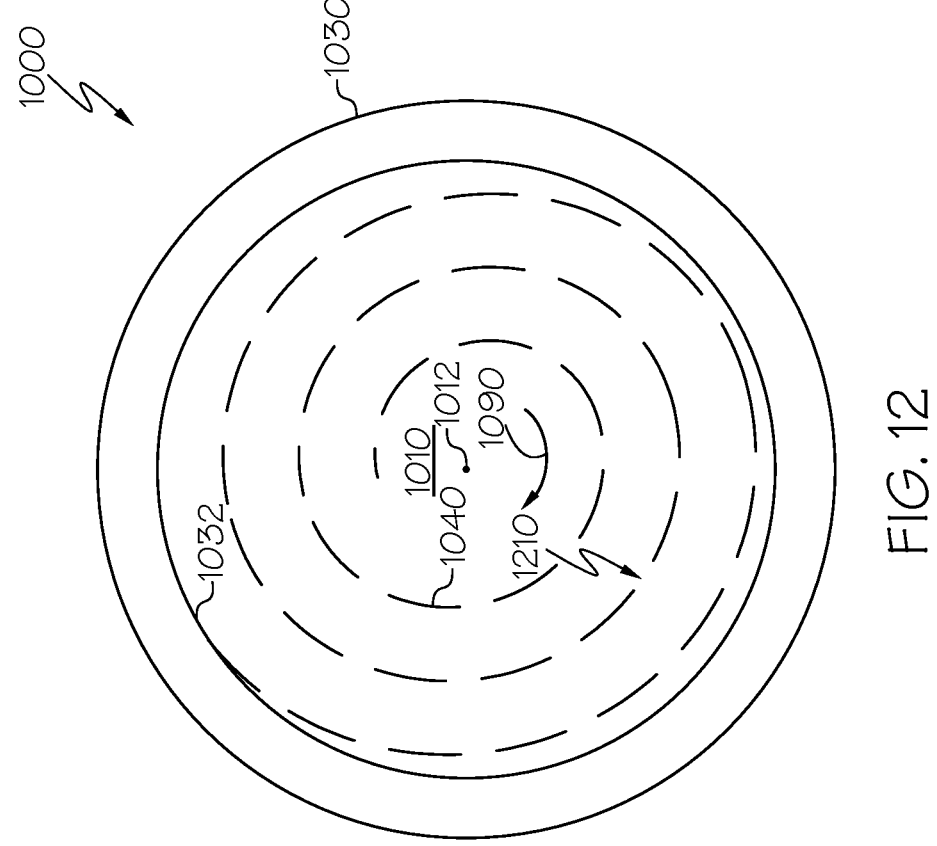
FIG. 12 schematically depicts a hollow-core optical fiber according to one or more embodiments described herein.

Referring now to FIG. 12, the rolled-glass cladding element 1040 comprises a plurality of slots 1210 such that the rolled-glass cladding element 1040 is discontinuous in a cross-section of the hollow-core optical fiber 1000 perpendicular to the central longitudinal axis 1012. Each of the plurality of slots 1210 may extend in a direction parallel to the central longitudinal axis 1012 for a distance less than a length of the hollow-core optical fiber 1000. In embodiments, each slot may have a width greater than or equal to 1 μm and less than or equal to 7 μm. As described herein the width of a slot refers to the distance that a slot extends in a circumferential direction 1090 in a plane perpendicular to the central longitudinal axis 1012 of the hollow-core optical fiber 1000. For example, without limitation, each slot may have a width from 1 μm to 7 μm, from 1.5 μm to 7 μm, from 2.5 μm to 7 μm, from 3.5 μm to 7 μm, from 4.5 μm to 7 μm, from 5.5 μm to 7 μm, from 6.5 μm to 7 μm, from 1 μm to 6 μm, from 1 μm to 5 μm, from 1 μm to 4 μm, from 1 μm to 3 μm, from 1 μm to 2 μm, or any range or combination of ranges formed from these endpoints. In some embodiments, each slot may have a width from 1 μm to 2.4 μm. Without intending to be bound by theory, the inclusion of slots in the rolled-glass cladding element 1040 may reduce the confinement loss of an optical signal propagating in the hollow core 1010 of the hollow-core optical fiber. Confinement loss may be reduced by slots that are comparable in width or slightly smaller than the operation wavelength (i.e., greater than 1 μm). However, light may leak from the hollow core 1010 if the slots are too wide (i.e., wider than 7 μm).

In embodiments, adjacent slots on the rolled-glass cladding element 1040 may be spaced apart from one another in a circumferential direction 1090. As described herein, slots are adjacent when a single portion of the rolled-glass cladding element 1040 is positioned between the slots in a cross section of the rolled-glass cladding element 1040 perpendicular to the central longitudinal axis 1012. In embodiments, adjacent slots may be spaced apart by a distance in a circumferential direction 1090 of greater than or equal to 5 μm and less than or equal to 40 μm. For example, without limitation, adjacent slots may be spaced apart from one another in a circumferential direction 1090 by a distance from 5 μm to 40 μm, from 10 μm to 40 μm, from 15 μm to 40 μm, from 20 μm to 40 μm, from 25 μm to 40 μm, from 30 μm to 40 μm, from 35 μm to 40 μm, from 5 μm to 35 μm, from 5 μm to 30 μm, from 5 μm to 25 μm, from 5 μm to 20 μm, from 5 μm to 15 μm, from 5 μm to 10 μm, or any range or combination of ranges formed from these endpoints. In some embodiments, adjacent slots may be spaced apart from one another in a circumferential direction 1090 by a distance from 10 μm to 25 μm. Without intending to be bound by theory, if the spacing between adjacent slots is too small (i.e., less than 5 μm) then the rolled-glass cladding element may be mechanically weak, as the rolled-glass cladding element would include very long, thin strips of glass separated by slots of comparable dimensions. Additionally, if the spacing between adjacent slots is too small (i.e., less than 5 μm) then negative interference may result in the attenuation of an optical signal propagating in the hollow-core optical fiber 1000. If the spacing between the slots is too great (i.e., greater than 40 μm), then there may be too few slots on each turn of the rolled-glass cladding element 1040 for the hollow-core optical fiber to benefit from the presence of the slots in the rolled-glass cladding element.

In embodiments described herein, the rolled-glass cladding element 1040 may comprise silica-based glass. In embodiments, the rolled-glass cladding element 1040 may consist essentially of or even consist of silica-based glass. In embodiments, the substrate 1030 may comprise silica-based glass. In some embodiments, the substrate 1030 may consist essentially of or consist of silica-based glass. Silica based glass may include pure silica or silica that is doped with one or more dopants to modify the index of refraction of the silica. In some embodiments, the silica-based glass may have an extinction coefficient of less than or equal to $1\times10^{-8}$. As described herein, the extinction coefficient (k) is the imaginary part of a complex refractive index $N=n+i*k$. Without intending to be bound by theory, material absorption may be determined by the extinction coefficient and the percentage of light intensity inside the glass. When the extinction coefficient is small (i.e., less than or equal to $1\times10^{-8}$), the glass absorption loss may be negligible, due to the small amount of light in the glass.

In embodiments, the hollow core 1010 may comprise one or more gasses. In embodiments, the hollow core 1010 may comprise one or more inert gasses. In embodiments, the hollow core 1010 may comprise, consist essentially of, or consist of air.

In embodiments described herein, the cladding 1020 may be configured to confine a fundamental mode of an optical signal (i.e., light) propagating in the hollow core 1010 of the hollow-core optical fiber 1000 by one or more of the anti-resonant effect and negative curvature. In embodiments, the fundamental mode of the optical signal guided by the hollow core 1010 may have a wavelength λ from 350 nm to 8000 nm. For example, without limitation, the fundamental mode of the optical signal guided by hollow core 1010 may have a wavelength from 350 nm to 12000 nm, from 500 nm to 12000 nm, from 1000 nm to 12000 nm, from 1500 nm to 12000 nm, from 2000 nm to 12000 nm, from 2500 nm to 12000 nm, from 3000 nm to 12000 nm, from 3500 nm to 12000 nm, from 4000 nm to 12000 nm, from 4500 nm to 12000 nm, from 5000 nm to 12000 nm, from 5500 nm to 12000 nm, from 6000 nm to 12000 nm, from 6500 nm to 12000 nm, from 7000 nm to 12000 nm, from 7500 nm to 12000 nm, from 8000 nm to 12000 nm, from 9000 nm to 12000 nm, from 10000 nm to 12000 nm, from 11000 nm to 12000 nm, from 350 nm to 11000 nm, from 350 nm to 10000 nm, from 350 nm to 9000 nm, from 350 nm to 8000 nm, from 350 nm to 7500 nm, from 350 nm to 7000 nm, from 350 nm to 6500 nm, from 350 nm to 6000 nm, from 350 nm to 5500 nm, from 350 nm to 5000 nm, from 350 nm to 4500 nm, from 350 nm to 4000 nm, from 350 nm to 3500 nm, from 350 nm to 3000 nm, from 350 nm to 2500 nm, from 350 nm to 2000 nm, from 350 nm to 1500 nm, from 350 nm to 1000 nm, from 350 nm to 500 nm, or any combination or subset of these ranges. In embodiments, the wavelength λ may be from 1200 nm to 1800 nm. In embodiments, the cladding may be configured to provide an anti-resonant effect at a wavelength from 350 nm to 8000 nm, the anti-resonant effect operable to confine an optical signal propagating in the hollow-core optical fiber 1000 at a wavelength from 350 nm to 8000 nm in the hollow core 1010.

Without intending to be bound by theory, confinement loss may be the dominant attenuation factor in the hollow-core optical fibers 1000 described herein. Confinement loss may occur as light leaks from the hollow core 1010 to the cladding 1020. Confinement loss (CL) may be calculated using Equation 2 and Equation 3.

$$n_{eff} = n_r + i \cdot n_{im} \quad \text{Equation 2}$$

$$CL\left[\frac{dB}{km}\right] = \frac{20}{\ln(10)} \cdot \frac{2\pi}{\lambda} \cdot \text{Im}(n_{eff}) \cdot 10^3 \quad \text{Equation 3}$$

In Equations 2 and 3, $n_{eff}$ is the effective index of the mode propagating in the hollow-core fiber with the real part of $n_r$ and the imaginary part of $n_{im}$. The wavelength is in the units of meters. The real part of the effective index is related to the propagation speed of the mode and the imaginary part is related to the confinement loss of the mode. For an anti-resonant hollow-core fiber with a given structure of the core and the cladding, the effective index may be determined using a fiber modeling tool, such COMSOL Multiphysics®. The confinement loss is calculated using Equation 3.

In embodiments, the cladding 1020 may be configured such that a minimum confinement loss of a fundamental mode of the optical signal propagating in the hollow-core optical fiber 1000 is less than 1 dB/km at the wavelength, of the fundamental mode guided by hollow core 1010. For example, without limitation, the cladding 1020 may be configured such that a confinement loss of a fundamental mode of the optical signal propagating in the hollow core 1010 of hollow-core optical fiber 1000 at a wavelength λ may be less than 1 dB/km, less than $10^{-1}$ dB/km, less than $10^{-2}$ dB/km, less than $10^{-3}$ dB/km, or even less than $10^{-4}$ dB/km.

EXAMPLES

The embodiments described herein will be further clarified by the following examples.

Figure 13:
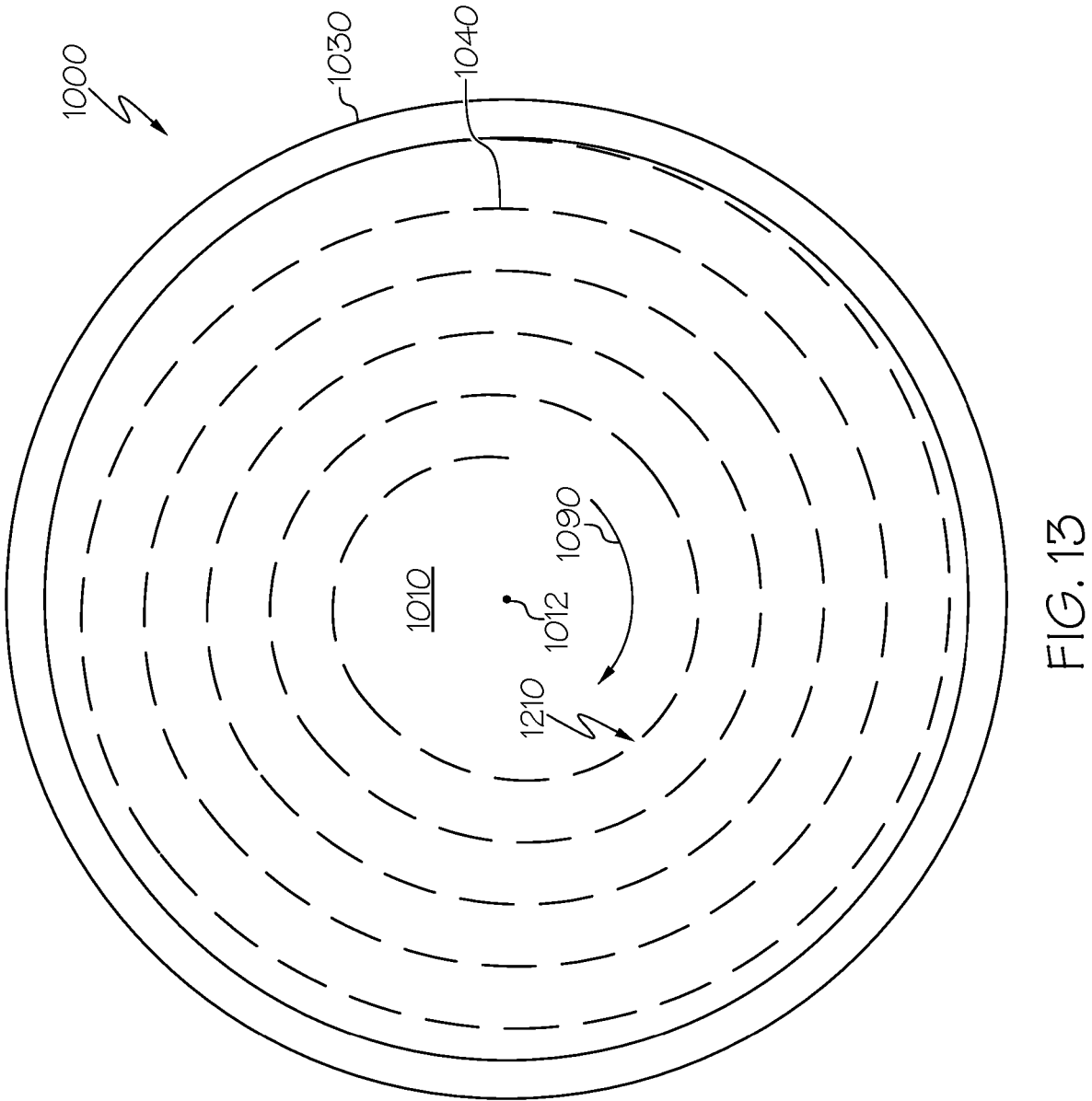
FIG. 13 depicts a cross-section of a first hollow-core optical fiber of Example 1.

Example 1—Modeling Confinement Loss of a Hollow-Core Optical Fibers as a Function of Wavelength A first hollow-core optical fiber 1000 was modeled to determine the confinement loss of the fiber. The first modeled hollow-core optical fiber 1000 of Example 1 has a cross section that is schematically depicted in FIG. 13. The first modeled hollow-core optical fiber 1000 comprised a rolled-glass cladding element 1040 and a substrate 1030. The rolled-glass cladding element 1040 had a thickness of 500 nm and included 6 turns. The rolled-glass cladding element 1040 included a plurality of slots 1210. Each slot had a width of 800 nm. Each slot was spaced apart from adjacent slots by a distance of 7 μm in a circumferential direction 1090. The hollow core 1010 had a diameter of about 30 μm. The substrate 1030 had an inner diameter of 84 μm and a wall thickness of 20 μm.

Figure 14:
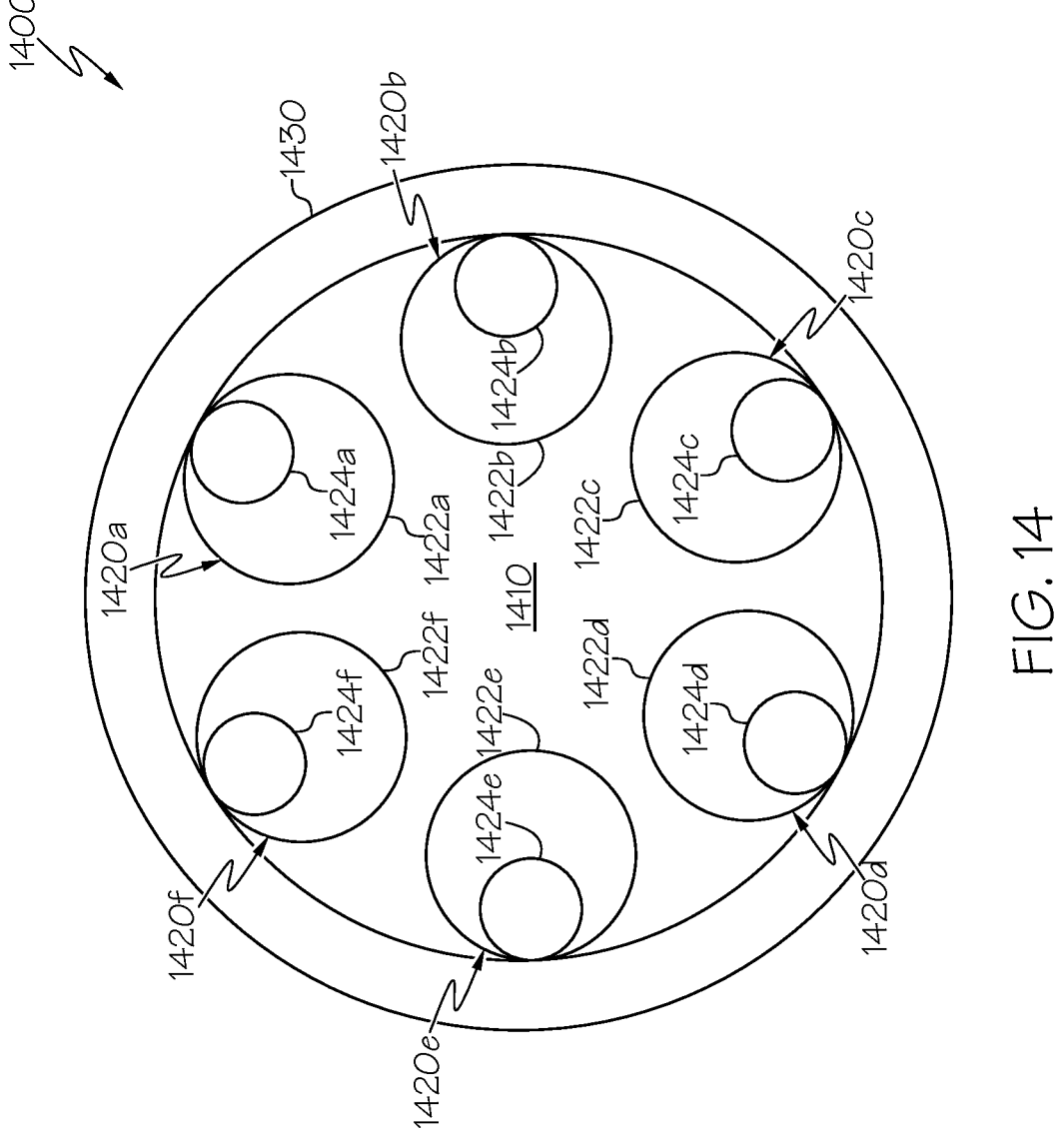
FIG. 14 depicts a cross-section of a second hollow-core optical fiber of Example 1.

A second hollow-core optical fiber 1400 was modeled to determine the condiment loss of the fiber. A cross section of the modeled second hollow-core optical fiber 1400 is depicted in FIG. 14. The second hollow-core optical fiber 1400 includes a substrate 1430 and six rolled-glass cladding elements 1420a, 1420b, 1420c, 1420d, 1420e, and 1420f. Each rolled-glass cladding element 1420 included a primary capillary 1422 (primary capillaries 1422a, 1422b, 1422c, 1422d, 1422e, and 1422f) and a nested capillary 1424 (nested capillaries 1424a, 1424b, 1424c, 1424d, 1424e, and 1424f). Each primary capillary 1422 had an outer diameter of 27.5 μm and a wall thickness of 500 nm. Each nested capillary 1424 had an outer diameter of 13 μm and a wall thickness of 530 nm. The substrate 1430 had an inner diameter of 125 μm and a wall thickness of 530 nm. The hollow core 1410 had a diameter of about 34.5 μm. As shown in FIG. 14, the position of the rolled-glass cladding elements 1420 was symmetric with a 60° rotational symmetry or six repetitions.

Figure 15:
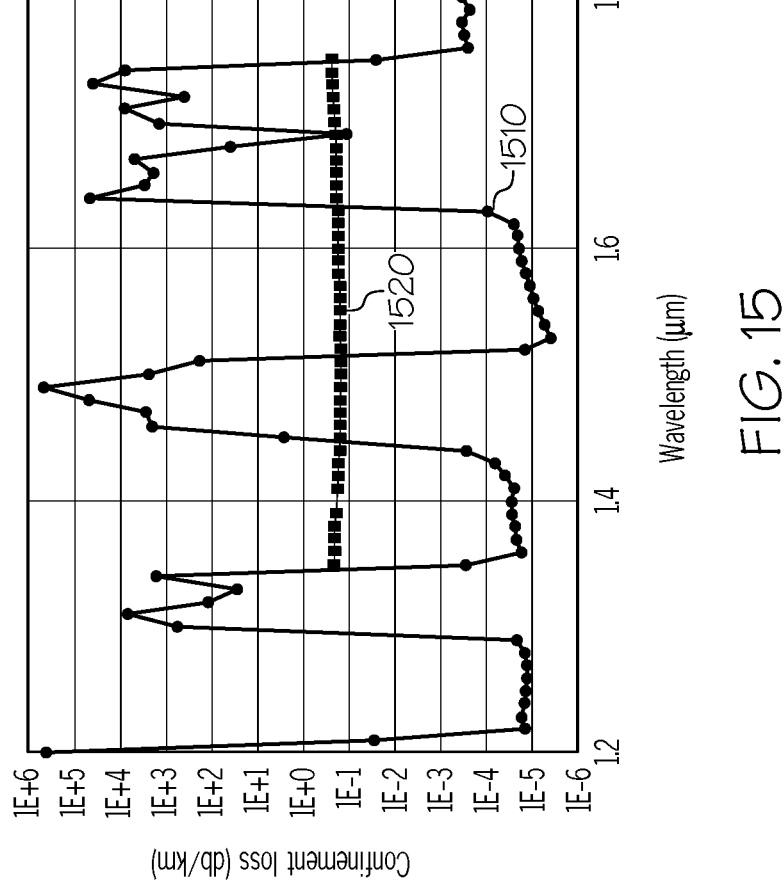
FIG. 15 graphically depicts the confinement loss as a function of wavelength of the first and second hollow-core optical fibers of Example 1.

The confinement loss of the first hollow-core optical fiber 1000 and the confinement loss of the second hollow-core optical fiber 1400 were modeled using Comsol Multiphysics modeling software over wavelengths ranging from 1200 nm to 1800 nm. The results are shown in FIG. 15. The confinement loss of the first hollow-core optical fiber 1000 is shown in plot 1510 and the confinement loss of the second hollow-core optical fiber 1400 is shown in plot 1520. According to the model, the good light confinement may be achieved by both hollow-core optical fibers; however, the first hollow-core optical fiber 1000 was able to achieve lower confinement loss at certain wavelengths.

A third hollow-core optical fiber was also modeled. The third hollow-core optical fiber had the same structure as the first hollow-core optical fiber except that the third hollow-core optical fiber did not include the plurality of slots in the rolled-glass cladding element. Comparing the first hollow-core optical fiber and the third hollow-core optical fiber showed that the slots enhance the confinement of an optical signal to the hollow core. While not intending to be bound by theory, this may be due to the decoupling of the core mode of the optical signal from the mode that is supported by the rolled-glass cladding element.

Example 2—Modeling Confinement Loss as a Function of Extinction Coefficient

Figure 16:
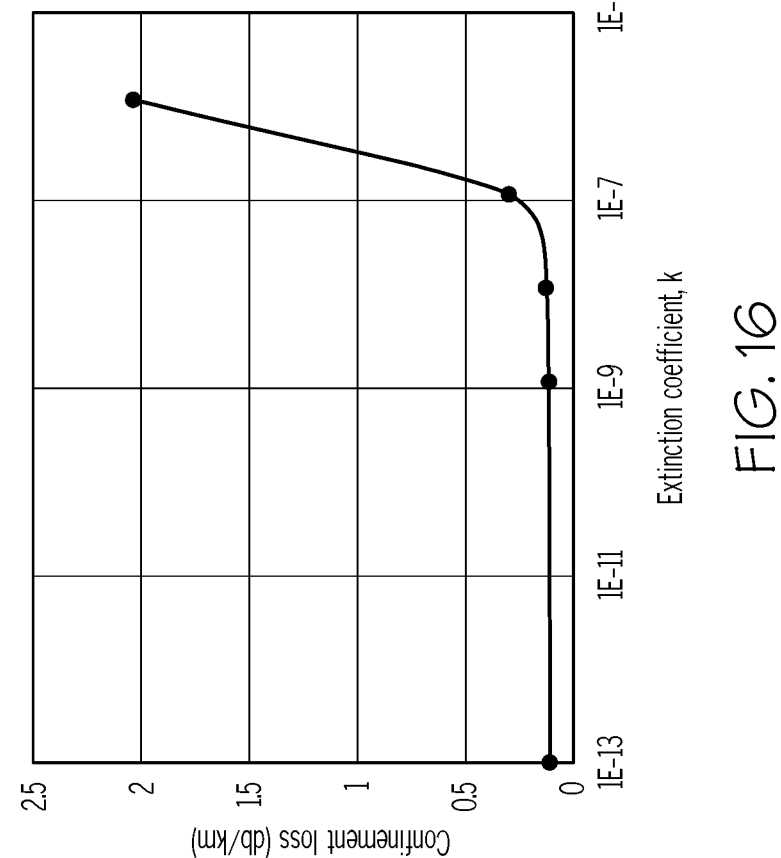
FIG. 16 graphically depicts confinement loss as a function of an extinction coefficient according to Example 2.

The confinement loss of the second hollow-core optical fiber of Example 1 was modeled as a function of the extinction coefficient of the glass. The extinction coefficient (k) is the imaginary part of a complex refractive index $N=n+i*k$. Material absorption is determined by the extinction coefficient and the percentage of light intensity inside the glass. The confinement loss of the hollow-core optical fiber was modeled with varying extinction coefficients from $1\times10^{-3}$ to $1\times10^{-6}$. The results are depicted in FIG. 16. When the extinction coefficient is below $1\times10^{-8}$, the glass absorption loss is negligible, due to the small amount of light in the glass. While pure silica has an extinction coefficient of $4\times10^{-13}$, some other silica-based glasses may have extinction coefficients of about $5\times10^{-8}$. The results depicted in FIG. 16 show that using a silica-based glass with an extinction coefficient of less than or equal to $1\times10^{-8}$ in the hollow-core optical fiber does not lead to significant absorption loss.

The present disclosure is directed to various embodiments of methods of making hollow-core optical fibers and various embodiments of hollow-core optical fibers. In embodiments, methods for producing hollow-core optical fibers may comprise rolling a glass sheet on itself to form a roll of wound glass; heating the roll of wound glass to a temperature greater than a softening point of the glass of the glass sheet; cooling the roll of wound glass after the heating to form a rolled-glass structure; attaching one or more of the rolled-glass structures to an inner surface of an annular support structure to form a hollow-core preform; and drawing the hollow-core preform into a hollow-core optical fiber. In some embodiments, the hollow-core optical fibers comprise a substrate, the substrate comprising a tubular shape and an inner surface surrounding a central longitudinal axis of the hollow-core optical fiber; a hollow core extending through the substrate along the central longitudinal axis of the hollow-core optical fiber; a cladding positioned between the central longitudinal axis of the hollow-core optical fiber and the substrate, the cladding comprising a rolled-glass cladding element positioned around the central longitudinal axis, wherein the rolled-glass cladding element comprises a plurality of turns around the central longitudinal axis. The hollow-core optical fibers may be operable to transmit optical signals, and the rolled-glass cladding elements may reduce attenuation of the optical signals through at least an anti-resonant effect.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A method for producing a hollow-core preform, the method comprising:

rolling a glass sheet to form a rolled-glass structure; and attaching one or more rolled-glass structures to an inner surface of an annular support structure to form a hollow-core preform, wherein the inner surface of the annular support structure defines an interior cavity and the one or more of the rolled-glass structures are positioned within the interior cavity, wherein the rolled-glass structure comprises greater than or equal to 2 and less than or equal to 15 turns, and a space between each turn of the rolled-glass structure is occupied by a gas.

2. The method of claim 1, wherein one or more turns of the rolled-glass structure are closed by an inner surface of the rolled-glass structure contacting an outer surface of the rolled-glass structure or an end of the rolled-glass structure.

3. The method of claim 1, wherein one or more turns of the rolled-glass structure are closed by an inner surface or an end of the rolled-glass structure contacting an outer surface of the rolled-glass structure.

4. The method of claim 1, wherein each turn of the rolled-glass structure is closed.

5. The method of claim 1, wherein a single rolled-glass structure is positioned within the interior cavity of the annular support structure.

6. The method of claim 1, wherein greater than or equal to 3 and less than or equal to 8 rolled-glass structures are positioned within the interior cavity of the annular support structure.

7. The method of claim 6, wherein the rolled-glass structures are spaced apart from adjacent rolled-glass structures in a circumferential direction about a central longitudinal axis of the annular support structure.

8. The method of claim 1, wherein the glass sheet has a thickness greater than or equal to 50 μm and less than or equal to 1000 μm.

9. The method of claim 1, further comprising a preliminary step of imparting a pattern to the glass sheet.

10. The method of claim 9, wherein the pattern comprises a plurality of slots extending through the glass sheet.

11. A method of forming a hollow-core optical fiber, the method comprising:

drawing an optical fiber from a hollow-core optical fiber preform, the hollow-core optical fiber preform comprising:

an annular support structure having an inner surface defining an interior cavity; and one or more rolled-glass structures attached to the inner surface and positioned within the interior cavity, each of the one or more rolled-glass structures comprising a plurality of turns, wherein a space between each turn of the one or more rolled-glass structures is occupied by a gas.

12. A hollow-core optical fiber comprising:

a substrate, the substrate comprising a tubular shape and an inner surface surrounding a central longitudinal axis of the hollow-core optical fiber;

a hollow core extending through the substrate along the central longitudinal axis of the hollow-core optical fiber; and a cladding positioned between the central longitudinal axis of the hollow-core optical fiber and the substrate, the cladding comprising a rolled-glass cladding element circumscribing the central longitudinal axis, wherein the rolled-glass cladding element comprises a plurality of turns around the central longitudinal axis and a space between each turn of the rolled-glass cladding element is occupied by a gas.

13. The hollow-core optical fiber of claim 12, wherein the rolled-glass cladding element comprises greater than or equal to 2 and less than or equal to 15 turns.

14. The hollow-core optical fiber of claim 13, wherein one or more turns of the rolled-glass cladding element are closed by an interior surface of the rolled-glass cladding element contacting an exterior surface of the rolled-glass cladding element or an end of the rolled-glass cladding element.

15. The hollow-core optical fiber of claim 13, wherein one or more turns of the rolled-glass cladding element are closed by an interior surface of the rolled-glass cladding element or an end of the rolled-glass cladding element contacting an exterior surface of the rolled-glass cladding element.

16. The hollow-core optical fiber of claim 13, wherein each turn of the rolled-glass cladding element is closed.

17. The hollow-core optical fiber of claim 12, wherein the rolled-glass cladding element comprises a plurality of slots such that the rolled-glass cladding element is discontinuous in a cross-section of the hollow-core optical fiber perpendicular to the central longitudinal axis.

18. The hollow-core optical fiber of claim 12, wherein the cladding provides an anti-resonant effect at a wavelength $\lambda$, the anti-resonant effect operable to confine an optical signal at the wavelength $\lambda$ in the hollow core.

19. The hollow-core optical fiber of claim 18, wherein the cladding is configured such that a confinement loss of a fundamental mode of the optical signal propagating in the hollow-core optical fiber is less than 1 dB/km at the wavelength $\lambda$, wherein the wavelength A is in a range from 1200 nm to 1800 nm.

\* \* \* \* \*